US007979325B2

(12) United States Patent
Kataoka et al.

(10) Patent No.: US 7,979,325 B2

(45) Date of Patent: Jul. 12, 2011

(54) ONLINE MERCHANDISING SYSTEM, SERVER, ESTIMATION MANAGING METHOD, COMPUTER PROGRAM PRODUCT, AND COMPUTER DATA SIGNAL

(75) Inventors: Keisuke Kataoka, Kanagawa (JP); Atsushi Hanai, Kanagawa (JP); Sachiko Misumi, Tokyo (JP); Eiji Shinohara, Kanagawa (JP); Shizuo Kamimura, Chiba (JP); Tatsuto Torikai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 2988 days.

(21) Appl. No.: 10/328,160

(22) Filed: Dec. 26, 2002

(65) Prior Publication Data

US 2003/0126046 A1 Jul. 3, 2003

(30) Foreign Application Priority Data

Dec. 28, 2001 (JP) ................................. 2001-401276

(51) Int. Cl.
*G06Q 10/00* (2006.01)

(52) U.S. Cl. ................ 705/28; 705/10; 705/26; 705/30; 705/35; 705/37; 705/80

(58) Field of Classification Search ..................... 705/28
See application file for complete search history.

(56) References Cited

U.S. PATENT DOCUMENTS 5,570,291 A * 10/1996 Dudle et al. .................... 700/95
5,948,040 A * 9/1999 DeLorme et al. ............. 701/201
6,460,036 B1 * 10/2002 Herz ............................... 707/10
6,731,625 B1 * 5/2004 Eastep et al. .................. 370/352
7,069,234 B1 * 6/2006 Cornelius et al. ............... 705/26
7,124,302 B2 * 10/2006 Ginter et al. .................. 713/189
7,167,844 B1 * 1/2007 Leong et al. .................... 705/80
2003/0041001 A1 * 2/2003 Hoffman et al. ................ 705/37

FOREIGN PATENT DOCUMENTS

JP 11-345270 12/1999
JP 2001-215371 8/2001
JP 2001-216406 A 8/2001
JP 2001-350979 12/2001

OTHER PUBLICATIONS

Drupa 2000 Preview: Industry Trends And Our Guide to the Exhibits. The Seybold Report on Publishing Systems , p. NA , May 8, 2000.*
Notification of reasons of refusal dated Jan. 30, 2007 directed to counterpart Japanese application No. 2001-401276.
Japanese Office Action dated Jun. 19, 2007, directed to counterpart JP Application No. 2001-401276 (2 pages).

* cited by examiner

*Primary Examiner* — F. Zeender
*Assistant Examiner* — Fawaad Haider
(74) *Attorney, Agent, or Firm* — Morrison & Foerster LLP

(57) ABSTRACT

A shopping server accepts a request for estimation of arbitrary designated items given by a client terminal, and generates estimation data for the designated items in accordance with the accepted request. The shopping server stores the generated estimation data at a shopping DB system. In response to retrieval of inventory status information for the items indicated by the estimation data stored in the shopping DB system, the shopping server updates the estimation data concerned in accordance with the retrieved inventory status information. The shopping server presents the updated estimation data to other client terminal in response to a request given by the client terminal which requested the estimation.

13 Claims, 32 Drawing Sheets

211

| ID | CUSTOMER NAME | ADDRESS | CATEGORY | GRADE | SALES AGENT | RECOMMENDED ITEM | OUR MESSAGE | DEST. CODE | AREA CODE |
|---|---|---|---|---|---|---|---|---|---|
| 00001 | Mr. A | Tokyo, JP | Business (ID: 001A) | A | aa (Tokyo SC) | Copy&Fax A123 | Your office . . . | K1111 | T01 |
| 00002 | Ms. B | Osaka, JP | Private | C | bb (Osaka SC) | Printer C332 | Our new . . . | K5432 | T09 |
| . . . | . . . | . . . | . . . | . . . | . . . | . . . | . . . | . . . | . . . |

| DATE | DEAL ID | ITEM | QT. | PRICE | TOTAL | BUYER (ID) | SALES AGENT | ... |
|---|---|---|---|---|---|---|---|---|
| Jan.1 | 1 | A123 | 1 | ¥10,000 | ¥11,300 | 01001 | aa | ... |
| | | C233 | 1 | ¥1,000 | | | | |
| | | X987 | 3 | ¥100 | | | | |
| | ⋮ | ⋮ | ⋮ | ⋮ | ⋮ | ⋮ | ⋮ | ... |
| ⋮ | ⋮ | ⋮ | ⋮ | ⋮ | ⋮ | ⋮ | ⋮ | ... |

| Invoice for "AAA Co.,Ltd." [JANUARY] | | | | | by aa of Tokyo SC | |
|---|---|---|---|---|---|---|
| DATE | ITEM | QT. | PRICE | ORDERED BY | BY ONLINE? | ... |
| Jan.1 | A123, A321 | 1 | ¥1,100,000 | Mr. A | YES | ... |
| Jan.2 | B321 | 2 | ¥1,000 | Ms. C | NO | ... |
| ⋮ | ⋮ | ⋮ | ⋮ | ⋮ | ⋮ | ... |

| ITEM CODE | MODEL | CATEGORY | SUB CATEGORY | STANDARD PRICE | RELATED ITEMS | . . . |
|---|---|---|---|---|---|---|
| A123 | "NE333" | Completed Item | Copier | ¥987,654 | Option B991<br>Supply C203 | . . . |
| ⋮ | ⋮ | ⋮ | ⋮ | ⋮ | ⋮ | . . . |
| C203 | "TN-2000" | Supply Item | Toner | ¥9,876 | Comp. A123<br>Comp. A246 | . . . |
| ⋮ | ⋮ | ⋮ | ⋮ | ⋮ | ⋮ | . . . |

| ID | CUSTOMER NAME | ADDRESS | CATEGORY | GRADE | SALES AGENT | RECOMMENDED ITEM | OUR MESSAGE | OWNER OF | DEST. CODE | AREA CODE |
|---|---|---|---|---|---|---|---|---|---|---|
| 00001 | AAA Co., Ltd. | Tokyo, JP | Business (ID: 000A) | A | aa (Tokyo SC) | Copy&Fax A123 | Your office . . . | A003 A172 | K1111 | T01 |
| 00002 | BBB & Co. | Osaka, JP | Business (ID: 000B) | A | bb (Osaka SC) | Printer C332 | Our new . . . | A321 A234 | K5432 | T09 |
| ⋮ | ⋮ | ⋮ | ⋮ | ⋮ | ⋮ | ⋮ | ⋮ | ⋮ | ⋮ | ⋮ |

| ID | USER NAME | ADDRESS | CATEGORY | GRADE | SALES AGENT | LOGIN ACCOUNT | OWNER OF | DEST. CODE | AREA CODE |
|---|---|---|---|---|---|---|---|---|---|
| 00001 | AAA Co., Ltd. | Tokyo, JP | Business (ID: 001A) | A | aa (Tokyo SC) | a@+++.com ******** | A123 C203 | K1111 | T01 |
| 00002 | Mr. B | Osaka, JP | Private | C | bb (Osaka SC) | b@$$$.com ******** | B823 | K5432 | T09 |
| ⋮ | ⋮ | ⋮ | ⋮ | ⋮ | ⋮ | ⋮ | ⋮ | ⋮ | ⋮ |

| DESTINATION CODE | SHIPPING PRIORITY BY DELIVERY CENTERS | | | | |
|---|---|---|---|---|---|
| | CENTER A | CENTER B | CENTER C | CENTER D | ... |
| K1111 (AREA T01) | 1 | | 2 | 3 | ... |
| K1234 (AREA T02) | 2 | 1 | 4 | 3 | ... |
| K2123 (AREA T04) | 1 | 2 | 9 | 6 | ... |
| K3131 (AREA T03) | 3 | 7 | 2 | | ... |
| ⋮ | ⋮ | ⋮ | ⋮ | ⋮ | ... |

| ITEM CODE | ITEM AVAILABILITY BY DELIVERY CENTERS | | | | |
|---|---|---|---|---|---|
| | CENTER A | CENTER B | CENTER C | CENTER D | ... |
| A003 | AVAILABLE | AVAILABLE | N/A | AVAILABLE | ... |
| A321 | AVAILABLE | N/A | N/A | AVAILABLE | ... |
| A234 | AVAILABLE | AVAILABLE | N/A | N/A | ... |
| A172 | N/A | AVAILABLE | N/A | N/A | ... |
| ⋮ | ⋮ | ⋮ | ⋮ | ⋮ | ... |

| AREA CODE | SHIPPING LEAD-TIME BY DELIVERY CENTERS | | | | |
|---|---|---|---|---|---|
| | CENTER A | CENTER B | CENTER C | CENTER D | ... |
| T01 | 1 DAY | | 2 DAYS | 2 DAYS | ... |
| T02 | 1 DAY | 1 DAY | 3 DAYS | 2 DAYS | ... |
| T03 | 2 DAYS | 4 DAYS | 1 DAY | | ... |
| T04 | 1 DAY | 1 DAY | 5 DAYS | 3 DAYS | ... |
| ⋮ | ⋮ | ⋮ | ⋮ | ⋮ | ... |

| ITEM CODE | STOCK STATUS | LOT | NEXT ARRIVAL | SCHEDULED DATE | RESERVED LOT |
|---|---|---|---|---|---|
| A003 | In Stock | 100 | N/SCHEDULED | --- | --- |
| A321 | In Stock | 1 | N/SCHEDULED | --- | --- |
| A234 | Sold Out | --- | SCHEDULED | Jan. 25 | 20 |
| A172 | Sold Out | --- | N/SCHEDULED | --- | --- |
| ⋮ | ⋮ | ⋮ | ⋮ | ⋮ | ⋮ |

*FIG. 9D*

ONLINE SHOPPING

Selected Item Page

You've Got 25,000 Points

ITEMS IN YOUR CART

| ITEM | ITEM CODE | QT. | STOCK STATUS | PT | UNIT PRICE | SUB TOTAL | |
|---|---|---|---|---|---|---|---|
| PRINTER P330 | 100049 | 3 | In Stock | 10000 | ¥200,000 | ¥600,000 | REMOVE |
| SCANNER SC50 | 100070 | 2 | Sold Out | 10000 | ¥100,000 | ¥200,000 | REMOVE |
| CD-R/RW R50 | 100074 | 1 | Sold Out | 10000 | ¥100,000 | ¥100,000 | REMOVE |
| | | | | | TOTAL | ¥900,000 | UPDATE TOTAL |

NOTE: Your total does not include Sales Tax and Shipping Charge.

[CONTINUE SHOPPING] [ESTIMATE] [CONSULTATION REQUEST] [ORDER]

ESTIMATION

Estimate Completed

Estimate No. QUO12345678 Date: YYYY/MM/DD

ESTIMATE

To: AAA Co., Ltd.

Term of Validity: YYYY/MM/DD
Destination of Delivery: AAA Co., Ltd. Tokyo Office
Payment: Regular Method

R Sales Co., Ltd.
Tokyo Service Center
1-2-3,***, Tokyo
Sales Agent: aa
TEL:03-****-1234

| ITEM | QT. | UNIT PRICE | PRICE |
|---|---|---|---|
| Printer P330 | 3 | ¥200,000 | ¥600,000 |
| ~~Scanner SK50~~ | ~~2~~ | ~~¥10,000~~ | ~~¥20,000~~ |
| CD-R/RW R50 | 1 | ¥100,000 | ¥100,000 |
| | | | |
| | | | |
| SUBTOTAL | | | ¥700,000 |
| SHIPPING CHARGE | | | Free |
| SALES TAX | | | ¥35,000 |
| **TOTAL** | | | **¥735,000** |

<NOTE>
Your sales agent or our service centers will accept your questions regarding to this estimate.
Please note that "Scanner SK50" has been sold out now.

ORDER | CONSULTATION REQUEST | UPDATE ESTIMATE | CANCEL ESTIMATE

*FIG. 20*

REQUEST FOR CONSULTATION

Form for Consultation Request

Items on the estimate will be ordered after the consultant approves it. Fill in the blanks below and click "REQUEST" button to offer the estimate to your consultant.

Consultant

[Mr. X ▼]

Contents of the Estimate: Color printers, etc.

Title of the Request (Not Omittable)

[                    ]

Reason for Acquisition (Omittable)

[                    ]

Date of Deadline (within the term of estimate validity)

[2001/11/20 ▼]   [VIEW ESTIMATE]

[SUBMIT]   [CANCEL]

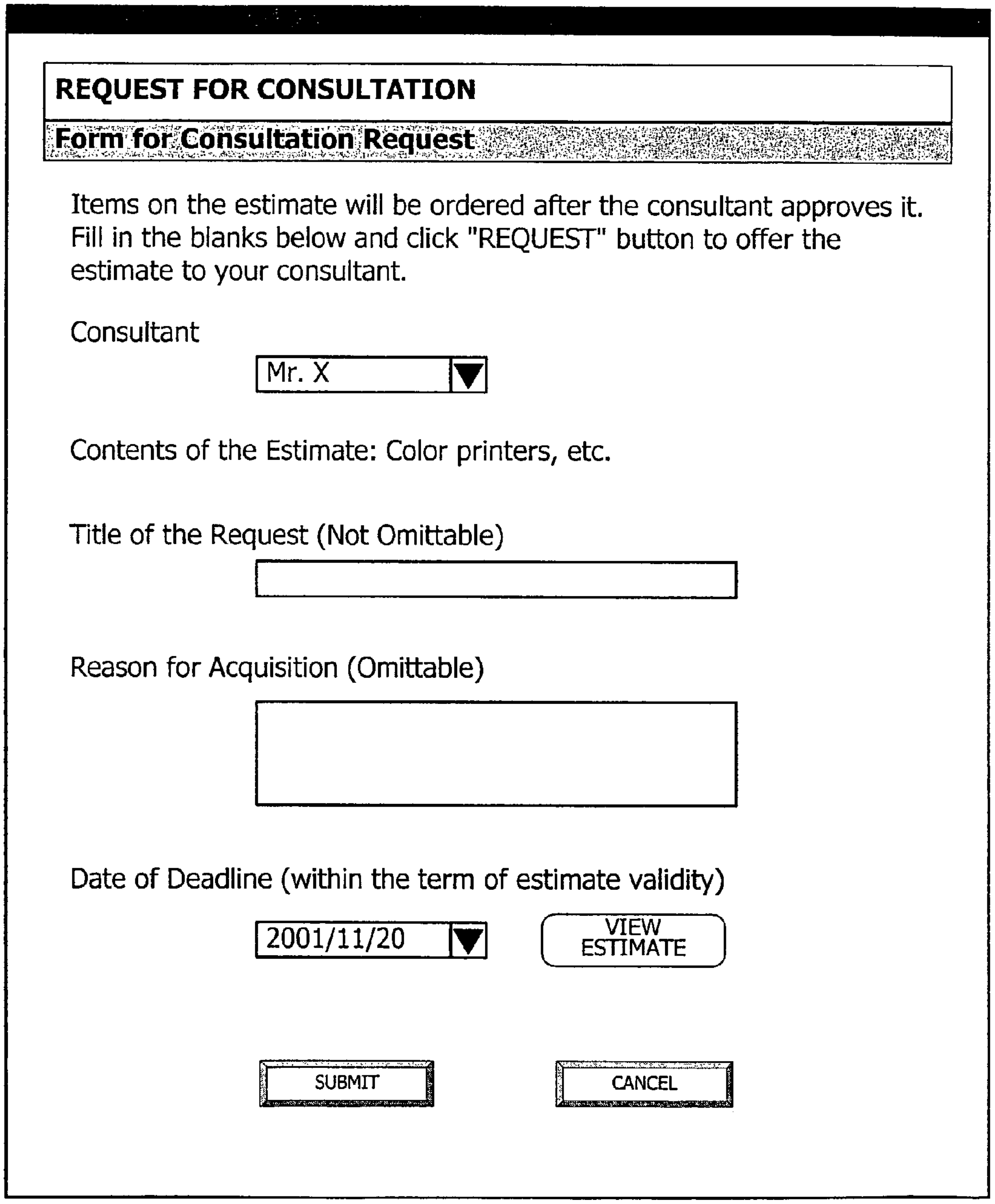

FIG. 22

Subject: Request for Consultation
Date: yyyy/mm/dd tt:mm
From: system@ricoh.**.jp
To: mrx@aaa.**.jp To Mr. X:

This is notice of "Request for Consultation" offered by Mr. A.

To see details of the request, access here:
http://www.ricoh.**.jp/consultation/0392839.htm The above web site will accept your reply to the request.

According to your approval, an order instruction will be sent to us automatically.

If you have any questions in this regard, please do not hesitate to reply this e-mail or call us.

**********************************************
Details of the Request
**********************************************

Serial No.:APR00001105
Title:Purchase of color laser printer (sales section)
Requested by:Mr. A
Date of Request:YYYY/MM/DD tt:mm
Deadline for Your Reply:YYYY/MM/DD 24:00

FIG. 23

Personalized Page for Mr. X (AAA Co.,Ltd.)

Online Shopping

Quick Link (Supply)

Item List
- View Cart
- Order Status

Application Service

Menu & Order Form
▲ eCalendar
▲ Utilities

Information

List
▲ News
▲ Weather Forecast
▲ Tips

What's New for Mr. X

Hello, Mr. X.
Your office will be improved by our new digital solution…

Your Sales Agent aa
(Tokyo Service Center)

Call: 03-0000-0000
E-mail: 0000@%%.com

You have 2 outstanding consultation matters.

VIEW DETAILS

Our Recommendation (More)

COPIERS    PRINTERS    SCANNERS

Topics    Online Services

CHANCE!!
You can get bonus points now. Click Here …

If you need legal forms, click here… more ▶

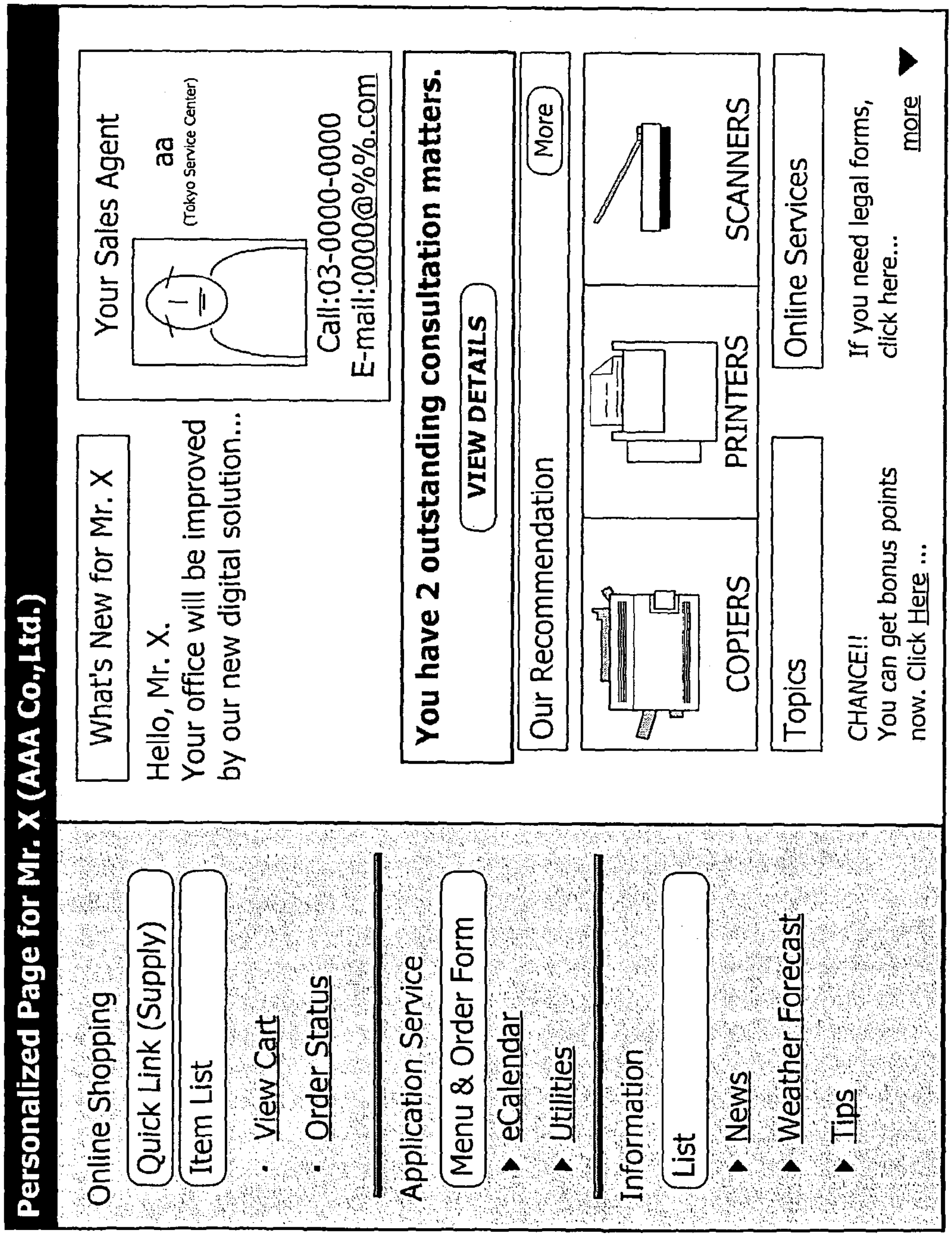

FIG. 24

CONSULTATION

Reply to Request

Serial No.: APR12345678

Subject: Purchase of Color Laser Printer in sales section

Title of Estimate: Color printer, etc.

Estimation No.: QUO123456789

Price Estimated: ¥700,000 (w/o tax)

Requested by: Mr. A

Date of Request: 2001/10/19

Deadline for Reply: 2001/11/20

Reason for Acquisition:
To provide more attractive presentation by colored documents, thus, to have advantages over the competitors.

Your Comments

[ APPROVE (ORDER) ] [ REJECT ] [ VIEW ESTIMATE ] [ VIEW ITEMS ] [ CANCEL ]

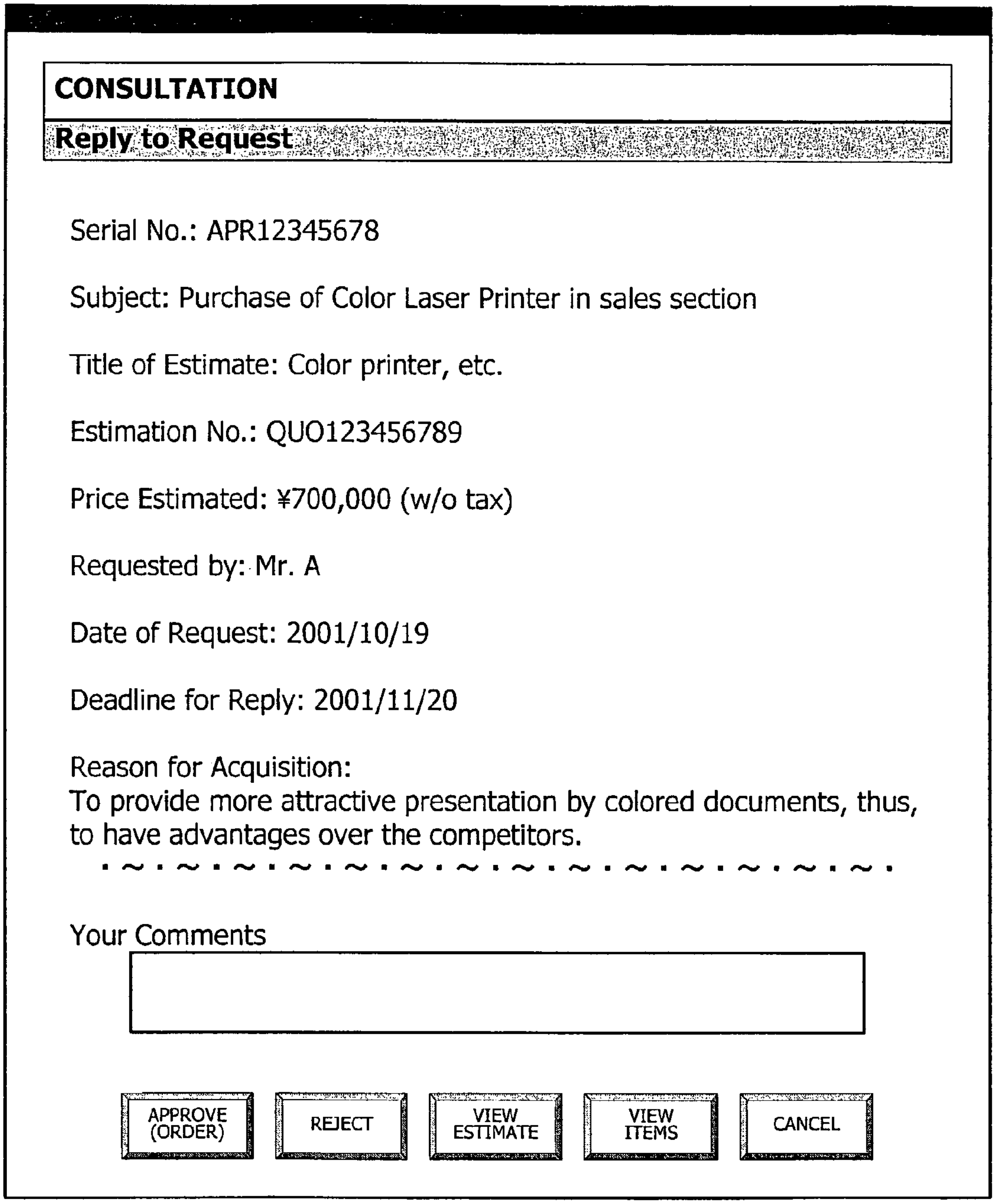

*FIG. 25*

REPLY TO REQUEST

Order Accepted

**The order has been accepted according to your approval.
Thank you for your order.**

We also inform Mr. A by e-mail that the order has been placed.

Order No.: NET00005678
Date of Order: 2001/10/19 14:29:03

Click here for cancel or modification.

---

PURCHASED BY:
Company:AAA Co., Ltd.
Section:Sales Section
Address:Tokyo...
Phone:03-****-1234
E-mail Address:mra@aaa.**.jp

---

Order Specification

| ITEM | QT. | UNIT PRICE | PRICE |
|---|---|---|---|
| Printer P330 | 3 | ¥200,000 | ¥600,000 |
| CD-R/RW R50 | 1 | ¥100,000 | ¥100,000 |
| SUBTOTAL | | | ¥700,000 |
| SHIPPING CHARGE | | | Free |
| SALES TAX | | | ¥35,000 |
| **TOTAL** | | | **¥735,000** |

ONLINE MERCHANDISING SYSTEM, SERVER, ESTIMATION MANAGING METHOD, COMPUTER PROGRAM PRODUCT, AND COMPUTER DATA SIGNAL

BACKGROUND OF THE INVENTION

1. Field of the Invention

The present invention relates to a field of the electronic commerce (EC) using telecommunications networks, more particularly to an online merchandising system, a server, an estimate managing method, a computer program product, and a computer data signal for effective use of estimation data.

2. Description of the Related Art

As growth of the Internet, "Online shopping" based on EC technology becomes very popular way of shopping. A user just operates an Internet connectable terminal such as a personal computer to enjoy the online shopping.

Ordinary, the user may be required sign-in process before login the online shopping site. After the successful login, item catalog pages may be presented to the user. If the user selects desired items on the catalog page, another accounting page is given. The shopping may be completed after the user inputs information necessary for accounting.

Not only private users (home users) but also business users (companies, enterprises, organizations, and the like) often use the online shopping. Ordinary, such the business users often requires estimates before purchase. For example, a person in charge of the purchase affairs (hereinafter, referred to as "purchase manager") may require the merchandiser to issue the estimate when they purchase items. Once the estimate is issued, the person in charge is often required to request his/her supervisor to have a consultation for approving the estimate. If the supervisor (consultant) approves the estimate, the items will be ordered.

Since it often takes considerable time before the consultant makes the decision for approval, stock status (inventory status) of the items may often fluctuate. That is, the items which were available (in-stock) when the estimate was issued, may become "sold-out" items when the consultant decides to approve the estimate. In such the case, the approved estimate may be invalid, thus, the company fails to achieve the purchase.

The present invention has been made as a solution for the above inconveniences, and it is an object of the present invention to provide an online merchandising system, a server, an estimate managing method, a computer program product, and a computer data signal for effective use of estimation data.

SUMMARY OF THE INVENTION

To achieve the above object, an online merchandising system according to a first aspect of the present invention is an online merchandising system for merchandising items in response to request from user terminals connected via a telecommunications network, comprises:

an estimation request acceptor for accepting a request for generating an estimate for arbitrary items designated by the user terminal;

an estimation generator for generating information of an estimate of the designated items based on the request accepted by the estimation request acceptor;

an estimation storage for storing the estimate information generated by the estimation generator;

an inventory status retriever for retrieving information of inventory status of the items indicated by the estimate information stored in the estimation storage;

an estimation updater for updating the estimate information in the estimation storage based on the inventory status information retrieved by the inventory status retriever; and an estimation presenter for, in response to a request given by said user terminal which requested the estimate generation, presenting the estimate information updated by the estimation updater to the other user terminal.

According to this invention, the estimation updater updates the estimate information stored in the estimation storage in accordance with the inventory status retrieved by the inventory status retriever. The estimation presenter presents the estimate information updated by the estimation updater to the user terminal which differs from the user terminal by which the request for estimation was given. As a result, effective use of the estimate information is realized.

The estimation presenter may comprise:

a consultation request acceptor for accepting a consultation request designating a consultant who consults the estimate for approval given by the user terminal; and an estimation provider for providing the user terminal handled by the designated consultant of the updated estimate information in response to the acceptance of the consultation request by the consultant request acceptor.

The online merchandising system may further comprise:

a reply acceptor for accepting reply information indicating whether the estimate is approved or rejected from the user terminal to which the estimate information was presented by the estimation presenter; and an order acceptor for accepting an order for the items included in the estimate presented by the estimation presenter when the reply acceptor accepts the reply information indicating that the estimate has been approved.

The online merchandising system may further comprise a notice provider for providing the user terminal which requested the estimate of notice information indicating that the estimate has been approved, when the reply acceptor accepts the reply information indicating that the estimate has been approved.

To achieve the above described object, an online merchandising system according to a second aspect of the present invention is a system including a requester terminal to be operated by a requester who requests a consultation of an estimate for approval, a consultant terminal to be operated by a consultant who consults the estimate, and a server for online merchandising, being connected to each other via a telecommunications network, wherein, the requester terminal comprises:

an estimation request transmitting unit which transmits estimation request information for requesting estimate of arbitrary designated items to the server; and a consultant request transmitting unit which transmits consultation request information for requesting the consultant to consult the estimate for approval, the consultant terminal comprises:

an address receiving unit which receives address information for indicating estimation data stored in the server, from the server;

an estimation retrieving unit which retrieves the estimation data stored in the server in accordance with the address information received by the address receiving unit; and a reply transmitting unit which transmits reply information indicating whether the estimate represented by the estimation data retrieved by the estimation retrieving unit is approved or rejected, to the server, and the server comprises:

an inventory data storage unit which stores inventory data indicating stock status of the items to be merchandised;

an estimation generating unit which, in response to the estimation request given by the requestor terminal, generates data representing estimation of in-stock items in accordance with the inventory data stored in the inventory data storage unit;

an estimation storage unit which stores the estimation data generated by the estimation generating unit;

an address transmitting unit which, in response to the consultation request given by the requestor terminal, transmits the address information indicating the estimation data stored in the estimation storage unit to the consultant terminal;

an estimation retrieving unit which, in accordance with the address information given by the consultant terminal, retrieves the estimation data stored in the estimation storage unit;

an estimation updating unit which updates the estimation data retrieved by the estimation retrieving unit to estimation data representing estimation for in-stock items;

an estimation transmitting unit which transmits the updated estimation data to the consultant terminal;

a reply receiving unit which receives reply information from the consultant terminal to which the estimation data was transmitted by the estimation transmitting unit; and an order accepting unit which accepts order for the items corresponding to the approved estimation, when the reply receiving unit receives the reply information indicating that the estimation is approved.

According to this invention, the estimation updating unit updates the estimation data retrieved by the estimation retrieving unit to estimation data for available items in accordance with the inventory data stored in the inventory data storage unit. The estimation transmitting unit transmits the estimation data updated by the estimation updating unit to the consultant terminal. As a result, effective use of the estimation data is realized.

The server may further comprise a reply forwarding unit which forwards the reply information received by the reply receiving unit to the requestor terminal.

To achieve the above described object, a server according to a third aspect of the present invention is a server being connected to user terminals via a telecommunications network, comprises:

an estimation request accepting unit which transmits an item menu data to the user terminal, and accepts a request for estimating selected items given by the user terminal concerned;

an estimation generating unit which generates estimation data representing estimate of the selected items based on the estimation request accepted by the estimation request acceptor;

an estimation storage unit which stores the estimation data generated by the estimation generating unit;

an inventory data retriever which retrieves information representing inventory status of the items indicated by the estimation data stored in the estimation storage unit;

an estimation updating unit which updates the estimation data stored in the estimation storage unit in accordance with the inventory status information retrieved by the inventory data retriever;

a presentation request acceptor which transmits image data of consultant designator page to the user terminal, and accepts request for presenting the estimation data to the designated consultant given by the user terminal concerned; and an estimation presenting unit which presents the estimation data updated by the estimation updating unit to the other user terminal operated by the designated consultant, based on the presentation request accepted by the presentation request acceptor.

According to this invention, the estimation updating unit updates the estimation data retrieved by the estimation retrieving unit to estimation data for available items in accordance with the inventory data stored in the inventory data storage unit. The estimation presenting unit presents the estimation data updated by the estimation updating unit to the user terminal operated by the consultant in accordance with the presentation request accepted by the presentation request acceptor. As a result, effective use of the estimation data is realized.

The estimation presenting unit may comprise:

an address transmitting unit which transmits address information indicating the estimation data stored in the estimation storage unit to the user terminal operated by the designated consultant; and an estimation transmitting unit which transmits the estimation data updated by the estimation updating unit in accordance with the address information given by the user terminal of the consultant.

The server may further comprise:

a reply accepting unit which accepts reply information indicating whether the estimate is approved or rejected, from the user terminal to which the estimation data was presented by the estimation presenting unit; and an order accepting unit which accepts order for the items indicated by the estimation data presented by the estimation presenting unit, when the reply accepting unit accepts the reply information indicating that the estimate was approved.

The server may further comprise a notice transmitting unit which transmits information notifying that the estimate was approved to the user terminal which requested the estimate, when the reply accepting unit accepts the reply information indicating that the estimate was approved.

To achieve the above described object, a server according to a fourth aspect of the present invention is a server connected to a telecommunications network which interconnects a requester terminal operated by a requestor who requests consultation of estimate for approval and a consultant terminal operated by a consultant who consults the estimate, comprises:

an inventory data storage unit which stores inventory data representing inventory status of items to be merchandised;

an estimation generating unit which, in response to a request for estimating designated items given by the requestor terminal, generates estimation data regarding to the available items in accordance with the inventory data stored in the inventory data storage unit;

an estimation data storage unit which stores the estimation data generated by the estimation generating unit;

an address transmitting unit which, in response to information requesting the consultant terminal to consult the estimate, transmits address information indicating the estimation data stored in the estimation data storage unit to the consultant terminal;

an estimation retrieving unit which, in response to the address information given by the consultant terminal, retrieves the estimation data stored in the estimation data storage unit;

an estimation updating unit which updates the estimation data retrieved by the estimation retrieving unit to estimation data for available items, in accordance with the inventory data stored in the inventory data storage unit;

an estimation data transmitting unit which transmits the estimation data updated by the estimation updating unit to the consultant terminal;

a reply receiving unit which receives reply information given by the consultant terminal to which the estimation data transmitting unit transmitted the estimation data; and an order accepting unit which accepts an order for the items indicated by the approved estimation when the reply receiving unit receives the reply information indicating that the estimate was approved.

According to this invention, the estimation updating unit updates the estimation data retrieved by the estimation retrieving unit to estimation data for available items in accordance with the inventory data stored in the inventory data storage unit. The estimation transmitting unit transmits the estimation data updated by the estimation updating unit to the consultant terminal. As a result, effective use of the estimation data is realized.

The server may further comprise a reply transmitting unit which transmits the reply information received by the reply receiving unit to the requester terminal.

To achieve the above described object an estimation managing method according to a fifth aspect of the present invention is a method applicable to a system for online merchandising in response to user terminals being connected to a telecommunications network, comprises the steps of:

accepting a request for estimation of designated items given by the user terminal;

generating estimation data representing estimation of the designated items in accordance with the accepted request for estimation;

storing the generated estimation data at a predetermined storage;

retrieving information representing inventory status of the items indicated by the stored estimation data;

updating the stored estimation data in accordance with the retrieved inventory status information; and presenting the updated estimation data to the other user terminal in accordance with a request given by the user terminal which requested the estimation.

According to this invention, the estimation data stored in the storage is updated in accordance with the retrieved inventory status information. In accordance with a request given by the user terminal which requested the estimation, the updated estimation data is presented to the other user terminal. As a result, the effective use of the estimation data is realized.

The presenting step may comprise the steps of:

accepting a request for consulting the estimate by designated consultant, given by the user terminal; and transmitting the updated estimation data to the other user terminal operated by the designated consultant in accordance with the accepted request.

The method may further comprise the steps of:

accepting reply information indicating whether the estimate was approved or rejected, given by the user terminal to which the estimation data was presented; and accepting an order for the items indicated by the presented estimation data in a case where the accepted reply information represents that the estimate was approved.

The method may further comprise the step of transmitting notice information indicating that the estimate was approved to the user terminal which requested the estimate in a case where the accepted reply information represents that the estimate was approved.

To achieve the above described object, method for managing estimation data according to a sixth aspect of the present invention is a method applicable to a server connected to a telecommunications network which interconnects a requestor terminal operated by a requestor who requests a consultant to consult the estimate for approval and a consultant terminal operated by the consultant who consults the estimate, comprises the steps of:

retrieving information representing inventory status of items to be merchandised;

generating estimation data in response to a request for estimation of designated items given by the requestor terminal so that the estimation data represents estimate of available items in accordance with the retrieved inventory status data;

storing the generated estimation data at a predetermined storage;

transmitting address information representing address of the stored estimation data to the consultant terminal in response to information requesting the consultant terminal to consult the estimate for approval given by the requester terminal;

retrieving the stored estimation data in accordance with the address information given by the consultant terminal;

updating the retrieved estimation data to estimation data representing estimate of available items in accordance with the retrieved inventory status information;

transmitting the updated estimation data to the consultant terminal;

receiving replay information given by the consultant terminal to which the estimation data was transmitted; and accepting an order for the items indicated by the approved estimation in a case where the received reply information indicates that the estimate was approved.

According to this invention, the retrieved estimation data is updated to estimation data for available items in accordance with the retrieved inventory status data. The updated estimation data is transmitted to the consultant terminal. As a result, effective use of the estimation data is realized.

The method may further comprise the step of transmitting the received reply information to the requestor terminal.

To achieve the above described object, a computer program product according to a seventh aspect of the present invention is a computer program product which causes a computer to execute an estimation managing method which comprises the steps of: accepting a request for estimation of designated items given by the user terminal; generating estimation data representing estimation of the designated items in accordance with the accepted request for estimation; storing the generated estimation data at a predetermined storage; retrieving information representing inventory status of the items indicated by the stored estimation data; updating the stored estimation data in accordance with the retrieved inventory status information; and presenting the updated estimation data to the other user terminal in accordance with a request given by the user terminal which requested the estimation.

To achieve the above described object, a computer data signal according to an eighth aspect of the present invention is a computer data signal embodied in a carrier wave which causes a computer to execute an estimation managing method which comprises the steps of: accepting a request for estimation of designated items given by the user terminal; generating estimation data representing estimation of the designated items in accordance with the accepted request for estimation; storing the generated estimation data at a predetermined storage; retrieving information representing inventory status of the items indicated by the stored estimation data; updating the stored estimation data in accordance with the retrieved inventory status information; and presenting the updated estimation data to the other user terminal in accordance with a request given by the user terminal which requested the estimation.

BRIEF DESCRIPTION OF THE DRAWINGS

The object and advantages of the present invention will become more apparent upon reading of the following detailed description and the accompanying drawings in which:

FIG. 3A exemplifying "Customer Data" in the in-shop DB system:

FIG. 3B exemplifying "Sales Data" in the in-shop DB system;

FIG. 3C exemplifying "Invoice Data" in the in-shop DB system;

FIG. 5A exemplifying "Item Data" in the master DB system;

FIG. 5B exemplifying "Customer Data" in the master DB system;

FIG. 7 exemplifying "Online User Data" in the shopping DB system;

FIG. 9A exemplifying "Shipping Priority Data" in the shipment DB system;

FIG. 9B exemplifying "Merchandise Availability Data" in the shipment DB system;

FIG. 9C exemplifying "Shipping Lead-time Data" in the shipment DB system;

FIG. 9D exemplifying "Inventory Data" in the shipment DB system;

FIG. 20 exemplifying "Estimate Page" to be displayed on the client terminal;

FIG. 22 exemplifying "Request for Consultation Page" to be displayed on the client terminal;

FIG. 23 exemplifying an e-mail for the consultation request to be sent to the client terminal of the consultant;

FIG. 24 exemplifying a personalized page including a message of "Request for Consultation" to be displayed on the client terminal of the consultant;

FIG. 25 exemplifying "Reply to Request Page" to be displayed on the client terminal of the consultant; and FIG. 26 exemplifying "Order Fulfillment Notice Page" to be displayed on the client terminal of the consultant.

DETAILED DESCRIPTION OF THE PREFERRED EMBODIMENT

Figure 1:
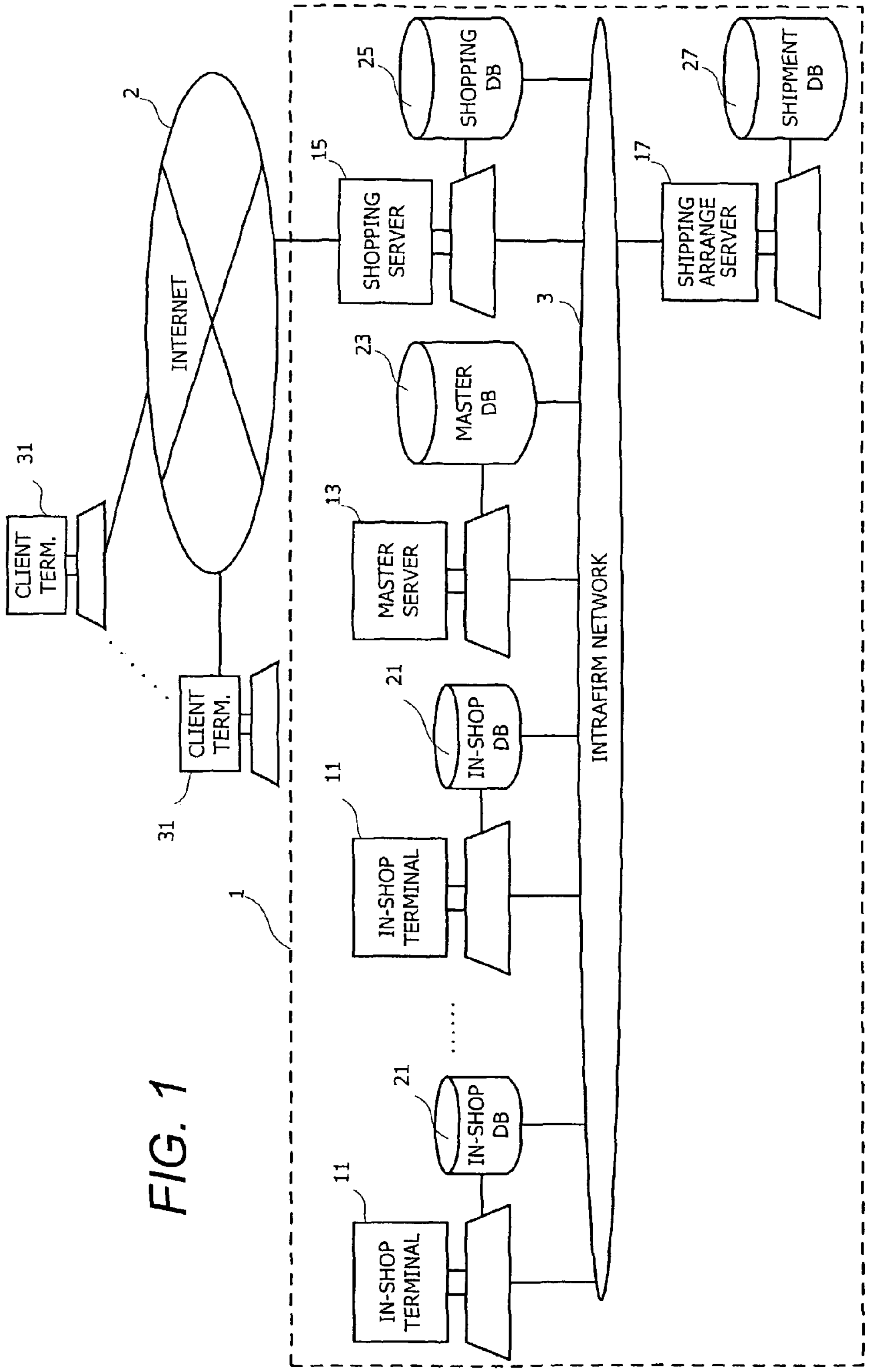
FIG. 1 showing the structure of "Online Merchandising System" according to embodiments of the present invention.

A preferred embodiment of the present invention will now be described with referring to accompanying drawings. FIG. 1 is a diagram schematically showing the structure of an online merchandising system according to the embodiment.

As shown in FIG. 1, the online merchandising system comprises an intrafirm network system 1 (closed network), the Internet 2 (open network), and client terminals 31. The intrafirm network system 1 may be owned by a business body (company, enterprise, organization, or the like) which has an online shopping site (hereinafter, referred to as "merchandiser").

The intrafirm network system 1 comprises an intrafirm network 3 (intranet) which interconnects a plurality of in-shop terminals 11 (being coupled with in-shop DB systems 21 respectively), a master server 13 (being coupled with a master DB system 23), a shopping server 15 (being coupled with a shopping DB system 25), and a shipping arrange server 17 (being coupled with a shipment DB system 27) to each other.

Figure 2:
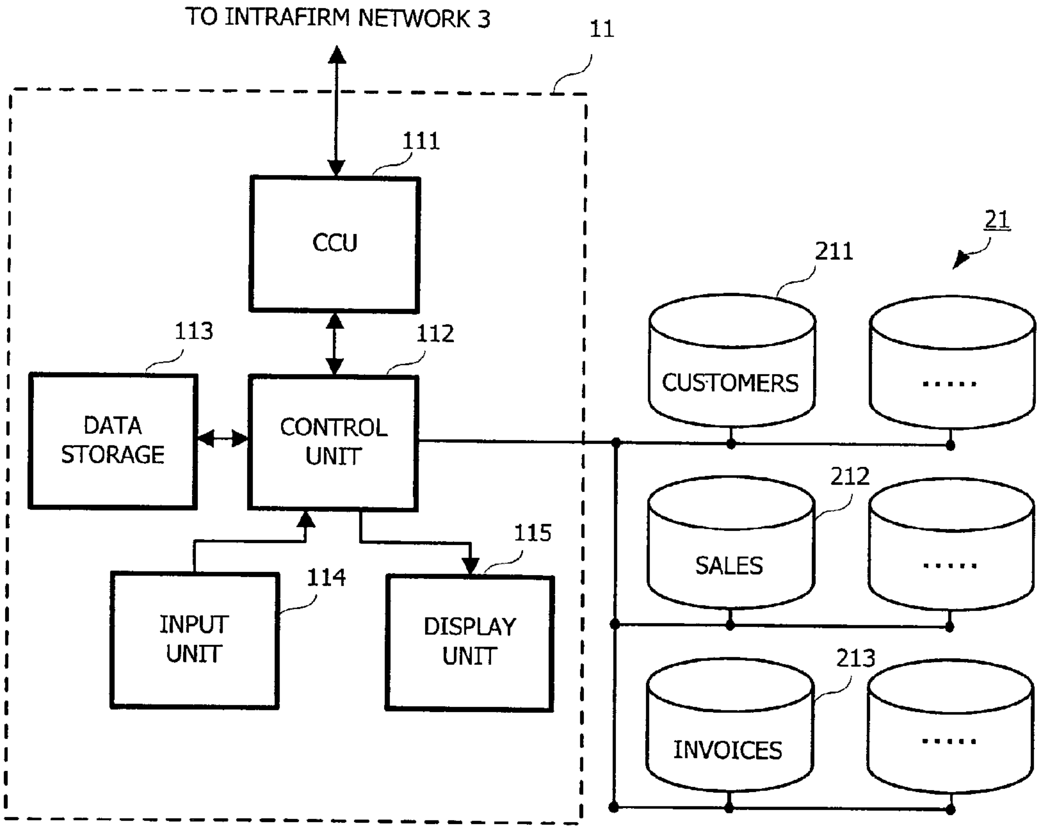
FIG. 2 showing the structure of a set of "In-Shop Terminal" and "In-Shop DB system" which is installed in each shop.

The in-shop terminals 11 are installed in authorized distributors, retailers, service centers and the like (hereinafter referred to as "shops") owned by or affiliated with the merchandiser. The in-shop terminal 11 processes business tasks in the shop concerned. FIG. 2 shows the typical structure of the in-shop terminal 11 and in-shop DB system 21.

As shown in FIG. 2, the in-shop terminal 11 comprises a communications control unit (CCU) 111, a control unit 112, a data storage unit 113, an input unit 114, and a display unit 115.

The CCU 111 works as interface to the intrafirm network 3 under control of the control unit 112 to establish connections to the master server 13 and the like for data communications.

The control unit 112 controls whole components in the in-shop terminal 11 to execute any data processing tasks for the business. For example, the control unit 112 controls the CCU 111 to establish data communications with other servers (the master server 13 and the like), in accordance with instructions given through the input unit 114, and generates image data to be supplied to the display unit 115.

The data storage unit 113 may be semiconductor memory modules, disk drives, or the like, and stores data and programs.

The input unit 114 comprises a keyboard, pointing devices, and the like, to input commands, data, and the like given by the operator.

The display unit 115 comprises a monitor, a video memory, and the like which displays images in accordance with the image data from the control unit 112 to present (output) information.

The in-shop DB system 21 comprises databases 211-213 for storing customer data, sales data, and invoice data, respectively.

As shown in FIG. 3A, the DB 211 stores information regarding to the customers of the shop. The information may include Customer ID, User Name, Address, User Category ("Business User" (company ID affixed) or "Private User"), Customer Grade, Sales Agent, Recommended Items, Messages from the sales agent, destination code, area code, and the like.

"Customer ID" shows a unique ID assigned to each customer. "Customer Grade" represents rating of the customers which determined by the sales agent. The grade will be reflected to discount rate, discount coupons, or the like. "Recommended Items" shows items now recommended by the sales agent. "Message" may shows greeting messages from the sales agent. "Destination Code" and "Area Code" represents state, prefecture, city or the like, to specify destination for delivery. In addition to the table shown in FIG. 3A, the DB 211 also stores data regarding to the business customers (not shown). The data are categorized into records each for a company (enterprise), to which a unique company code (company ID) is assigned. Each of the records includes information regarding to persons who deal with purchasing affairs.

As shown in FIG. 3B, the DB 212 stores sales data. The data are categorized into records each for a unit of dealing. Each record includes information of: item code, quantity, and price of sold merchandises; buyer (customer ID); sales agent; and the like. Because the data are categorized by dealing unit, it is helpful for easy search for the sold items.

As shown in FIG. 3C, the DB 213 stores data of invoices (debit notes) issued monthly. The data are categorized into records each for a customer. Each of the records includes information of: dealing date; item code, quantity, and price (sales price) of bought item; person in charge of ordering; and the like. In this embodiment, the invoices for the business users are issued by the shops even if the purchases are done by the online shopping. Therefore, the invoice data include information for distinguishing whether the dealing is done by the online shopping or not ("Online User?" in FIG. 3C).

The master server 13 and the master DB system 23 shown in FIG. 1 collaborates with each other to handle whole the business tasks of the merchandiser.

Figure 4:
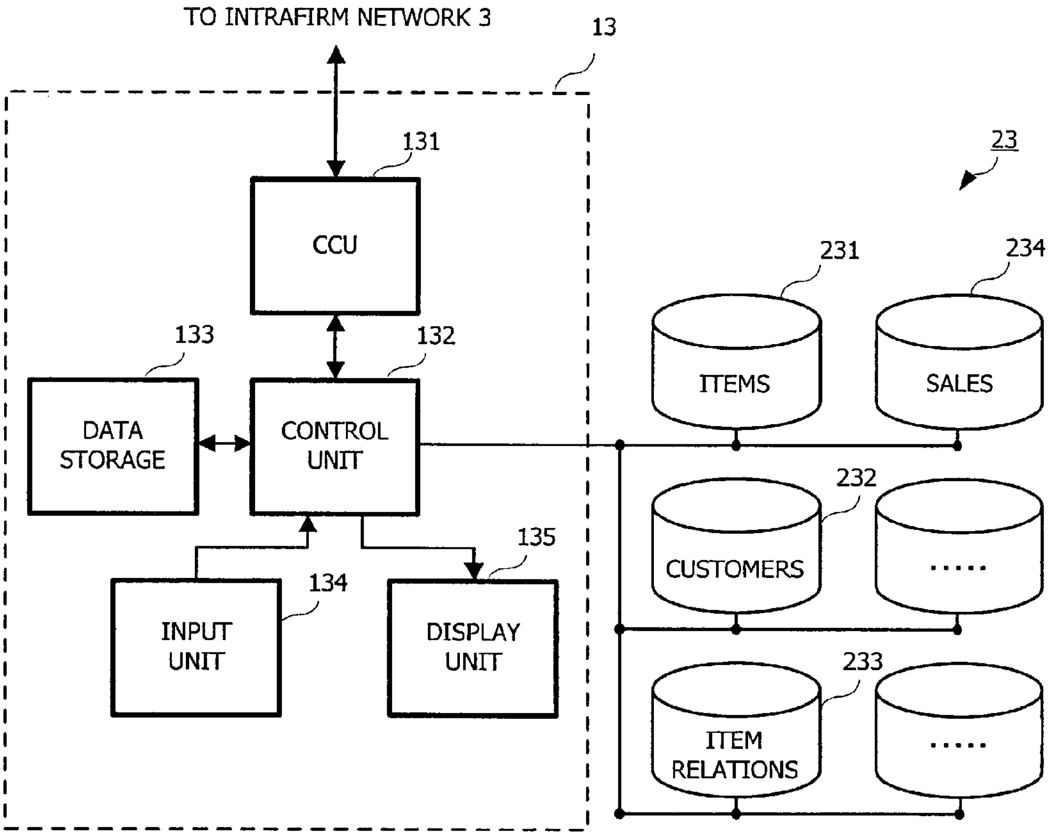
FIG. 4 showing the structure of a set of "Master Server" and "Master DB system"

As shown in FIG. 4, the master server 13 comprises a communications control unit (CCU) 131, a control unit 132, a data storage unit 133, an input unit 134, and a display unit 134. Those components except the control unit 132 have the structures and functions which are the same as those of the corresponding components in the in-shop server 11. The control unit 132 is equipped with extra functions necessary for handling the tasks of whole business in the merchandiser.

The master DB system 23 stores collected data regarding to the whole business. As shown in FIG. 4, the master DB system 23 includes databases 231-234 each storing information of "Items", "Customers", "Item Relations", and "Sales" respectively.

As shown in FIG. 5A, the DB 231 stores data of all items the merchandiser handles. The data include information of: "Item Code", "Model", "Category", "Sub Category", "Standard Price", "Related Items", and the like. "Category" represents categories of each listed item. That is, the items may be categorized to, for example, "Completed Item", "Option Item", and "Supply Item". "Completed Item" represents items each of which has necessary functions as a whole to fulfil its purpose by itself. "Option Item" stands for items each of which is useless by itself, but collaborates with a certain completed item to provide it of extra functions. "Supply Item" means items to be used in the completed item or optional item, and those are exhausted through daily use. For example, in case of "Copier", the copier itself belongs to "Completed Item". An ADF (Automatic Document Feeder) unit, a sorter unit, a telecommunication unit, an extra power unit, and the like may belong to "Option Item", because those items are installed in or attached to the copier for use. And, a toner cartridge, copy paper, and the like may belong to "Supply Item". In case of "Digital Camera", the digital camera itself is in "Completed Item" category. A cable which connects the digital camera to a PC, a software package for transferring images to the PC, and the like may be in "Option Item" category. And, a battery pack, a memory card, and the like may be in "Supply Item" category.

"Related Items" represents other items belonging to other categories but are compatible with the item concerned. In a case where the item concerned is categorized to "Completed Item", item codes representing option items or supply items compatible with the completed item concerned are registered in "Related Items". In the same manner, if the item concerned is an option item, item codes of the corresponding completed items or supply items are registered. If the item concerned is supply item, item codes of the corresponding completed items or option items are registered. That is, data in "Related Items" are prepared reciprocally. In FIG. 5A, "C203" is registered as a related item of "A123" and vice versa.

Since it has such the relational database structure, once a target item is specified, the related items are also specified immediately, thus it is helpful for searching items. That is, it is able to search an item based on related items and vice versa, or based on categories.

The DB 232 stores information regarding to all customers of the merchandiser. As shown in FIG. 5B, the contents of data are fundamentally the same as those in the DB 211 shown in FIG. 3A, however, it also includes information representing items (machines) which are already owned by each customer. As well as the DB 211, the DB 232 also stores data of the business customers (not shown).

Figure 5C:
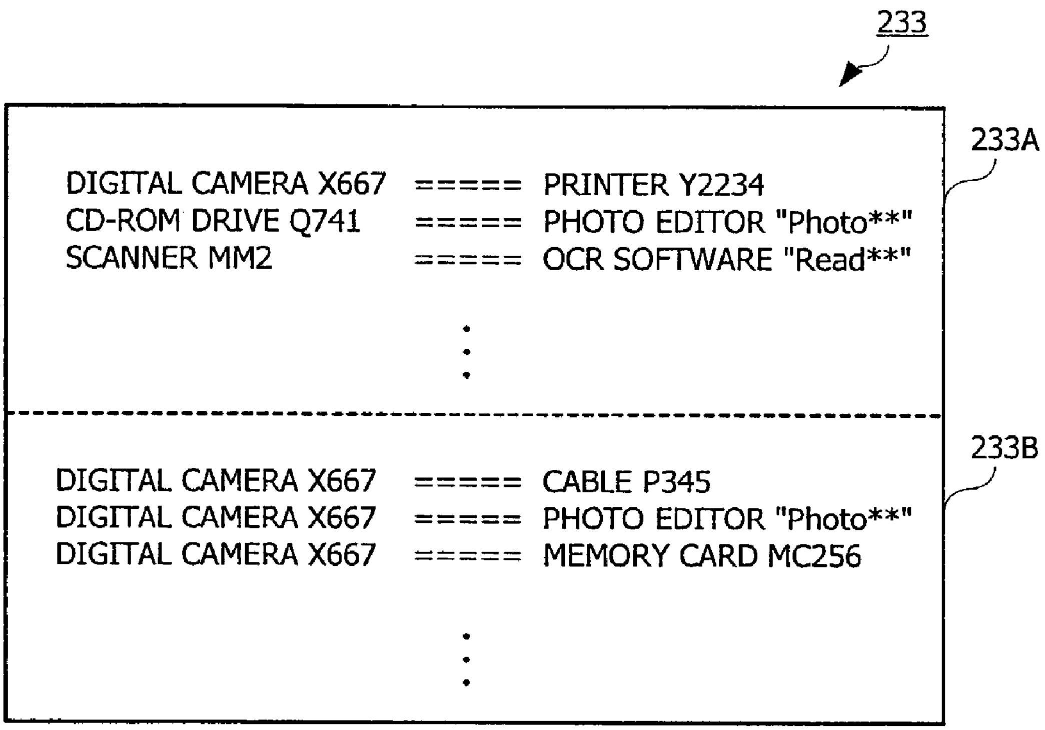
FIG. 5C exemplifying "Item Relation Data" in the master DB system.

As shown in FIG. 5C, the DB 232 stores information representing relations between a master item and other servant items being compatible with the master item. More precisely, the servant items are items which may be or should be bundled with the master item. In a case where a digital camera is purchased, for example, it is recommendable that a software package for retouching the captured photo images or a printer for printing the photo images is bundled with the digital camera. If the obviously recommendable relations are previously known, the operator of the master DB system 23 inputs information of such relations to an area 233A in the DB 233.

In addition to such the known relations, the market often reveals unpredicted relations in accordance with the customers' purchasing trend. In other words, if the trend shows that many customers tend to buy a certain item together with another certain item, and a relation between those items has not been registered, it means that a new relationship which has been unpredicted is found out. Such the relation should be registered as well as the registered known relations, because it reflects the actual customers' demand. Under such the situation, the control unit 132 checks the sales history to find out which item is often purchased together with another item. For example, the control unit 132 calculates the rate of bundling, and picks up items whose bundling rate exceeds a given threshold (for example, 5%). The control unit 132 registers information representing the relation between the picked up items in an area 233B in the DB 233.

The DB 234 stores data regarding to the whole sales of the merchandiser, that is, the data represents sales of all shops. The information stored in the DB 234 is fundamentally that stored in the DB 212 shown in FIG. 3B, that is, the information is distinguished by dealings. Therefore, the master server 13 can retrieve information representing bundled items from the data in the DB 234.

Figure 6:
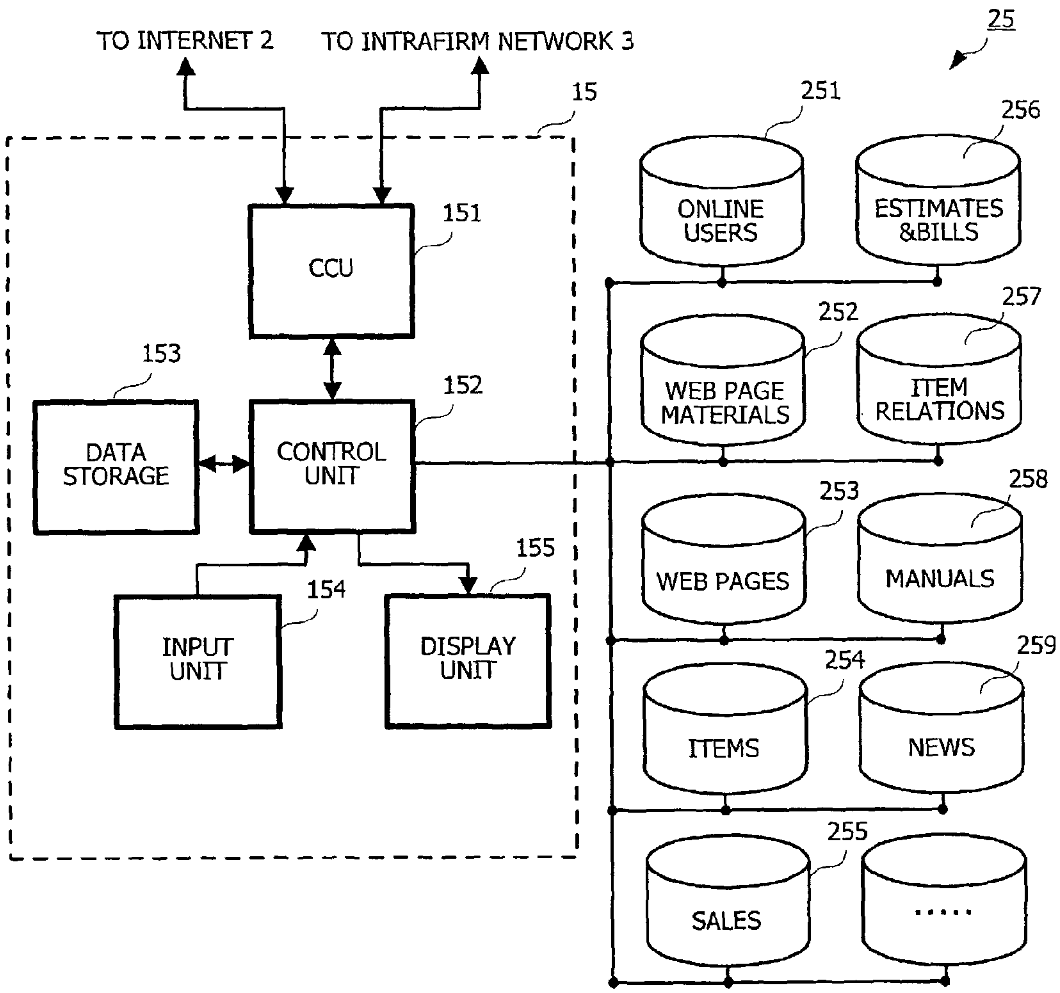
FIG. 6 showing the structure of a set of "Shopping server" and "Shopping DB system"

The shopping server 15 and the shopping DB system 25 collaborate with each other as a system to handle tasks for the online shopping. FIG. 6 shows the structures of them.

As shown in FIG. 6, the shopping server 15 comprises a communications control unit (CCU) 151, a control unit 152, a data storage unit 153, an input unit 154, and a display unit 155.

Those components except the control unit 152 have almost the same structures as those of the corresponding components in the in-shop terminal 11. The control unit 152 has extra functions for web page presentation and accounting tasks.

As shown in FIG. 7, the shopping DB system 25 comprises databases 251-258 for storing online user data, web page materials, web page data, item data, sales data, estimate and bill data, related items data, manual data, and news data, respectively.

The DB 251 stores data of online users including information of: Customer ID, User Name, Address, User Category ("Business User" (with company ID) or "Private User"), User Grade, Sales Agent who dealing with the user, Login Account (e-mail address and password), Owning Items, Destination Code, Area Code, and the like, as shown in FIG. 7.

If the user is categorized in the business user and has dealt with the merchandiser without the online shopping, "Customer ID" may be duplicate of that registered in the in-shop terminal 11 concerned. In case of the business user, "User Name" may represent name of the person in charge. "Login Account" includes a pair of e-mail address and password those required at sign-in stage of the online shopping. In case of the business user, the login account belongs to persons in charge who dealing with purchasing (for example, persons belonging to General Affair Section, Purchase Section, or the like). "Owning Item" represents items (completed items) owned by the user. If a certain user has dealt only via the online shopping, its purchase history is registered. If a certain business user has dealt via the online shopping and the ordinary purchasing at the shop, the owning items reflect the purchase histories of the both ways. The number of Login Account is flexible in accordance with the number of the persons in charge.

The contents of Grade, Sales Agent, Destination Code, and Area Code may be duplicate of those registered in the DB 211 of the in-shop DB system 21. As well as the DB 211, the DB 251 also stores data of the business users (not shown).

The DB 252 stores data representing various materials for generating web pages. For example, the data may represent portrait images of the sales agents, pictures of the items, banners, fixed sentences, and the like.

The DB 253 stores data of web pages for the online shopping service.

The DB 254 stores data of the items handled by the online shopping. The data are duplicate of those stored in the DB 231 shown in FIG. 5A.

The DB 255 stores sales data categorized into the dealing unit as well as the DB 212 shown in FIG. 3B.

The DB 256 stores data regarding to estimates and bills on the online shopping. In this embodiment, each shop issues bills to the business users even if their purchases are done by the online shopping. Therefore, managing the billing data by the in-shop terminals 11 is sufficient for billing tasks, however, the DB 256 also stores the billing data for user's reference request given through the online shopping service. The DB 256 also stores estimation data representing estimates for items in response to generation thereof.

The DB 257 stores data of related items those dealt by the online shopping. The data are retrieved from the DB 233 of the master DB system 23.

The DB 258 stores electronic files representing user's manuals for the items.

The DB 259 stores data representing news retrieved from various news sources or provided by the shopping server 15. Those news materials are categorized into news categories.

Figure 8:
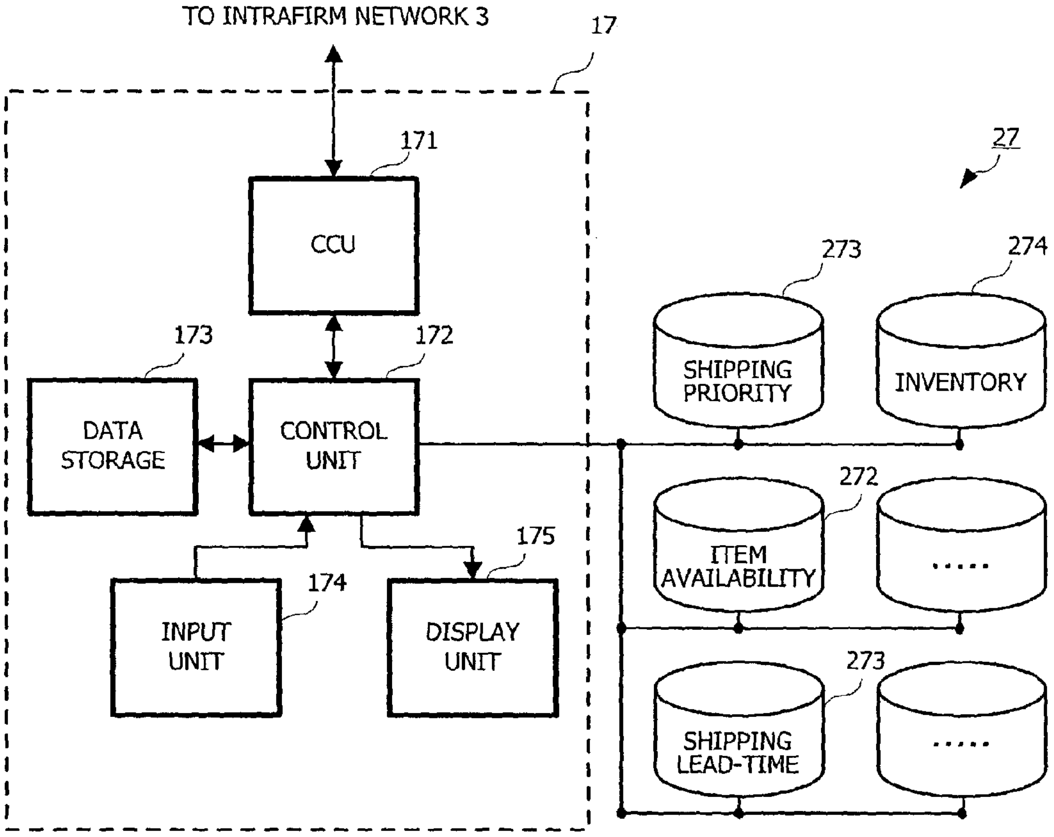
FIG. 8 showing the structure of a set of "Shipping arrange server" and "Shipment DB system"

The shipping arrange server 17 and the shipment DB system 27 collaborate with each other to handle the orders, manage the inventory, and the like. FIG. 8 shows the structures of them.

As shown in FIG. 8, the shipping arrange server 17 comprises a communications control unit (CCU) 171, a control unit 172, a data storage unit 173, an input unit 174, and a display unit 175.

Those components except the control unit 172 have almost the same structures as those of the corresponding components in the in-shop terminal 11. The control unit 172 has the extra functions for arranging shipments, inventory management, scheduling shipments, or the like.

As shown in FIG. 8, the shipment DB system 27 has databases 271-274 each storing data of Shipping Priority, Merchandize Availability, Shipping Lead-time, and Inventory.

As shown in FIG. 9A, the DB 271 stores priority data applied to delivery centers affiliated with the merchandiser in accordance with the destination codes. The delivery arrange server 17 refers to those data to determine the appropriate delivery center based on the destination code.

As shown in FIG. 9B, the DB 272 stores data representing availability of the items at each delivery center. In FIG. 9B, the table has indicators of "Available" or "Not Available (N/A)" to show which item is available at which center.

As shown in FIG. 9C, the DB 273 stores data of shipment lead-time in accordance with the area codes. The "lead-time" shows that how many days are required for delivery (from the delivery center to the customer).

The DB 274 stores data of inventory to reveal stock status of the items. As shown in FIG. 9D, the data show stock status ("Stock Status"), stocked lot ("Lot"), schedule of next arrival ("Next Arrival"), date of next arrival ("Scheduled Date"), reserved lot at next arrival ("Reserved Lot"), and the like of each item ("Item Code"). The configuration of the stocked lot or reserved lot may depend on each delivery center.

The client terminal 31 (shown in FIG. 1) comprises an internet connectable terminal such as a personal computer. The client terminals 31 may be operated by customers (including purchase managers of the companies) of the online shopping, and consultants (for example, superior officers or supervisors of the purchase managers) who make decision ("approval" or "reject") for the purchase matters based on the given estimates.

Operations for the system having the above described structure will now be described with reference to accompanying drawings.

The daily tasks of the sales agents in each shop are to contact the customers for merchandising, and to find new customers.

Once a new order occurs, an operator of the in-shop terminal 11 operates the in-shop terminal 11 to register data regarding to the order to the DB 212 (sales data) of the in-shop DB system 21. A unique order No. is applied to each order even if a plurality of items are ordered at once. In a case where a new customer is found, the sales agent registers data of that customer to the DB 211 (customer data). If the new customer is business user, the sales agents also input customer grade, recommended items, message to the customer, and the like.

The master server 13 constantly accesses the in-shop DB systems 23 and the shopping DB system 25, and retrieve updated data (difference) to updated the master DB system 23. For example, data representing whole sales on that day is registered to the DB 234 (sales data) by batch process during after-hours (midnight). In relation to the sales update, the master server 13 also updates customer data in the DB 232 to reflect the items (completed items) owned by the customers. The master server 13 updates the customer data in the DB 232 when modifications or additions (new customer) occur.

The master server 13 also retrieves data of customer grade, recommended items, messages, and the like from the DB 211 (customer data) in each shop, and duplicates them to the DB 251 (online user data) of the shopping DB system 25. Further, the master server 13 analyzes the updated data in the DB 234 to find out significant combinations of items those purchased at once (hereinafter, referred to as "bundled items). The master server 13 generates "item relation data" representing the relations between the items based on the analysis. The master server 13 also generates another set of the item relation data for online shopping at the same time. Those generated sets of the item relation data are added to the DB 233 and DB 257.

Operations required to enjoy the online shopping will now be described.

A business user who intend to use the online shopping service provided by the system of this embodiment must make an application to the shop for membership. The application requires information regarding to purchase manager (s). The information may include at least name and user account (that is, e-mail address and password) of the purchase manager(s). The purchase manager may be officially assigned one to represent his/her company at the phase of using the online shopping. The sales agent adds customer grade and the like to the application. The customer grade may be optimized to coordinate with the services provided by each shop. The information on the written application form is transferred to an operator of the shopping server 15 to register it to the DB 251 (online user data) as shown in FIG. 7.

On the contrary, a private user who intends to use the online shopping service may operates the client terminal 31 to access a web page for user registration presented by the shopping server 15. The access may be established via an ISP (Internet Service Provider: not shown) and the Internet 2. The registration page requires the user to input e-mail address, address, name, payment method, and the like. After the registration is completed, the shopping server 15 issues password to the user, and registers it to the DB 251 (online user data) together with user ID.

Figure 10:
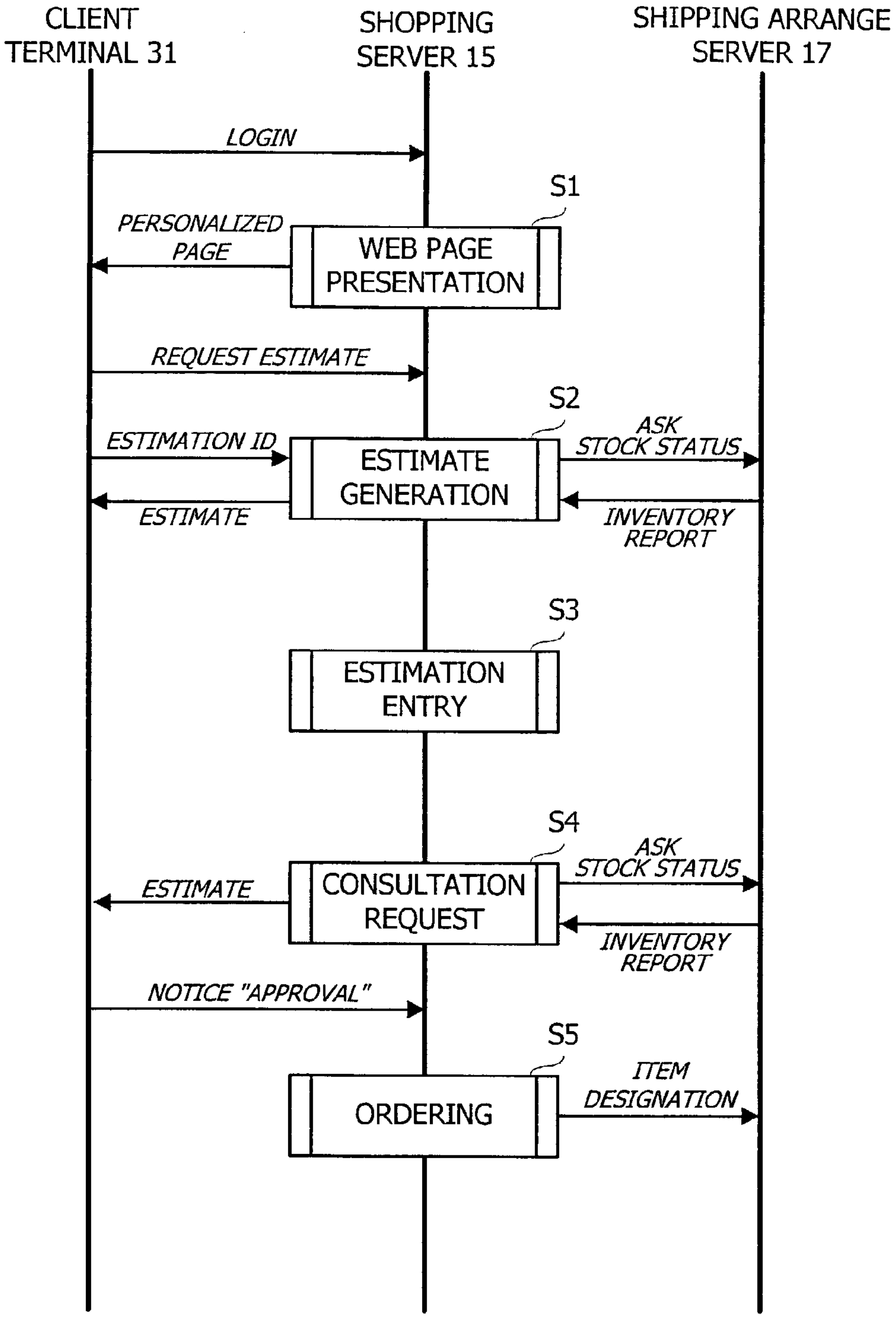
FIG. 10 representing a main flowchart for explaining relational process among the client terminal, the shopping server, and the shipping arrange server during the online shopping.

After the above user registration process is completed, online shopping service is available. Relative operations carried out during the online shipping will now be described with reference to FIG. 10 and following drawings. FIG. 10 represents a main flowchart for explaining relative operations among the client terminal, shopping server, and shipping arrange server.

In response to the access from the client terminal 31, the shopping server 15 starts "Web Page Presentation" process (step S1). Through the web page presentation process, the shopping server 15 identifies users based on data from the client terminal 31, and decides whether the accessing user is allowed to access the personalized pages or not.

Figure 11:
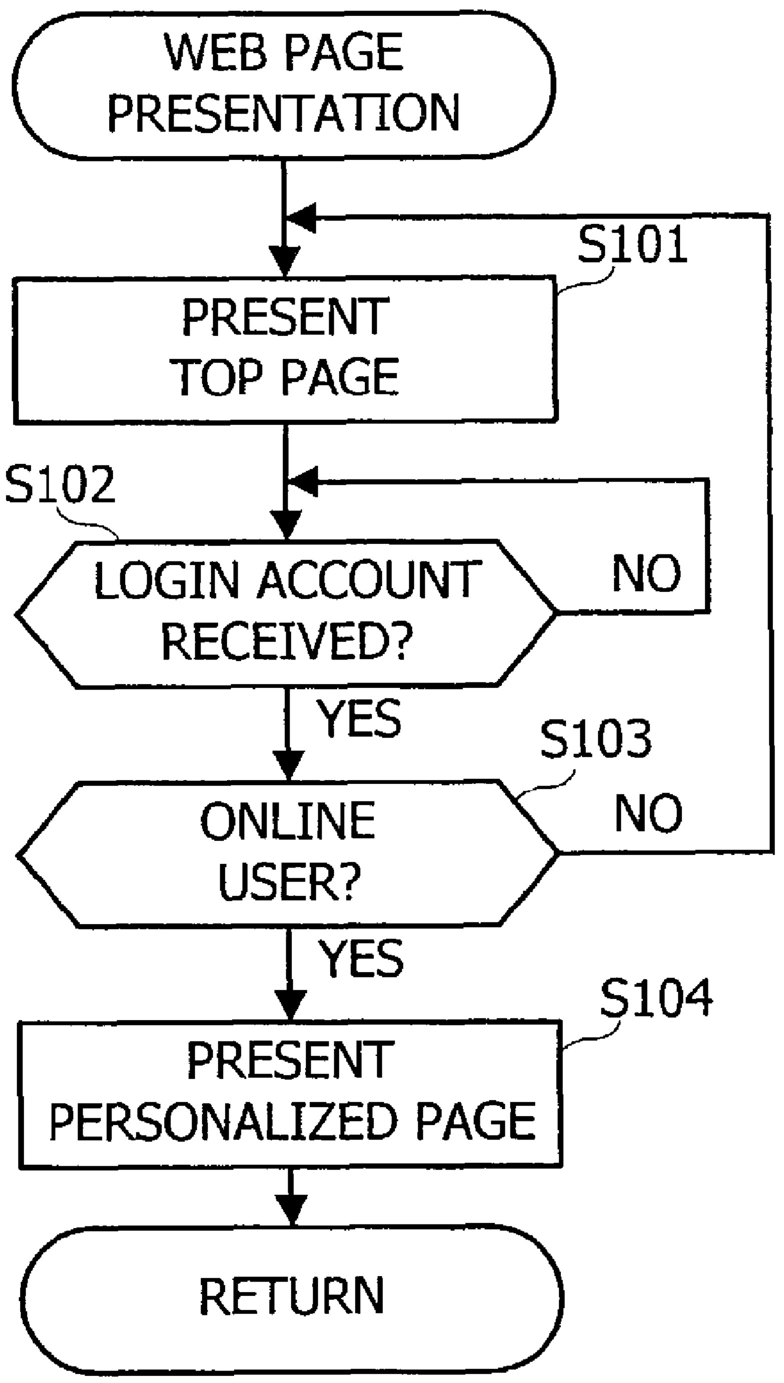
FIG. 11 representing a flowchart for explaining "Web Page Presentation" process.
Figure 12:
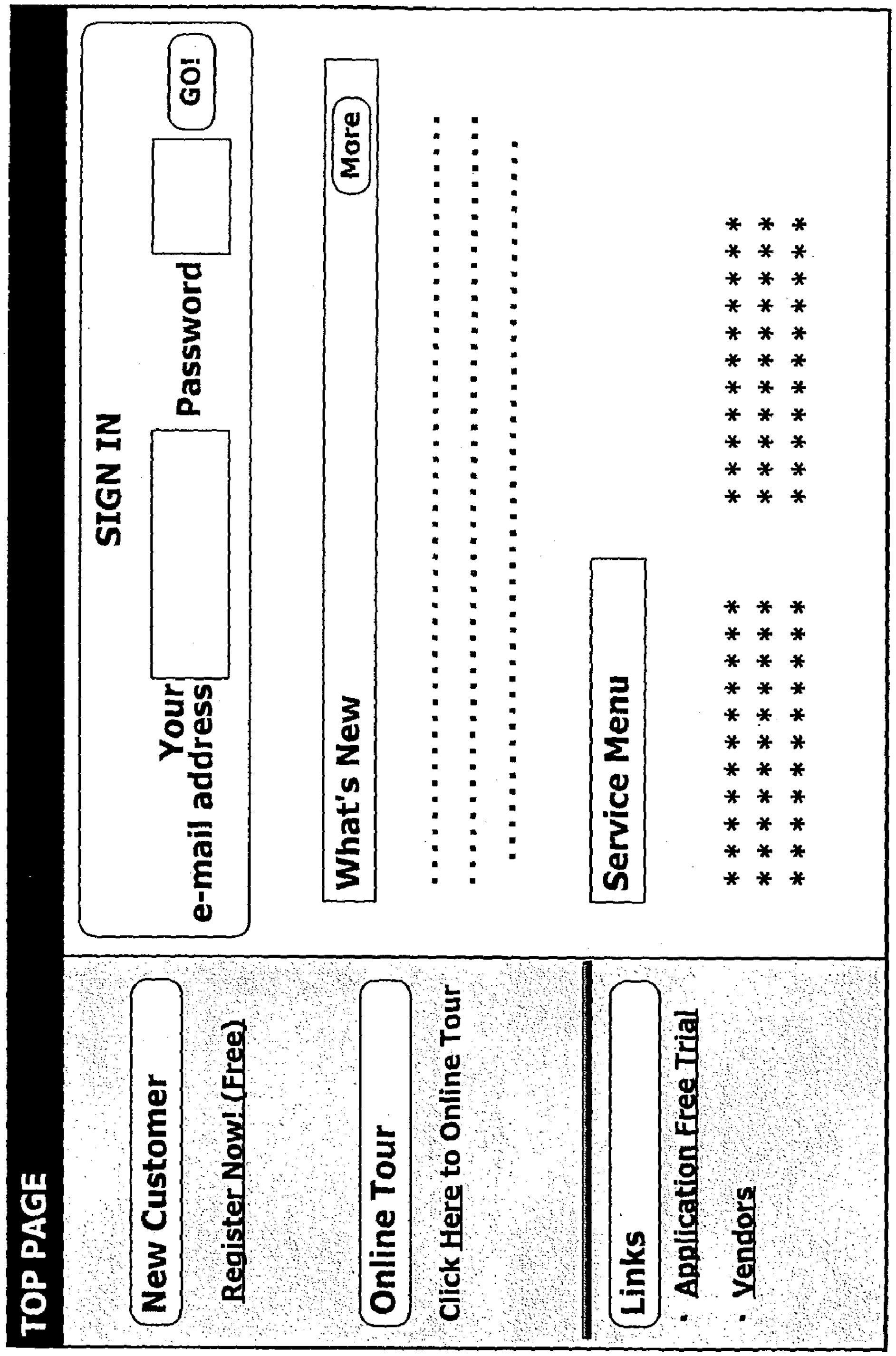
FIG. 12 exemplifying "Top Page" to be displayed on the client terminal.

Detailed steps of the web page presentation process (step S1) will now be described with reference to FIG. 11. At beginning of the process, the shopping server 15 presents a top page for sign-in to the client terminal 31 concerned (step S101). FIG. 12 exemplifies the top page to be displayed on the client terminal 31. As shown in FIG. 12, the top page has text boxes to input login account (e-mail address and password).

The shopping server 15 waits for the instructions from the client terminal 31 (step S102).

The user concerned operates the client terminal 31 to input login account and click "Go" button, thus, the input information is transmitted to the shopping server 15.

The shopping server 15 receives the user account information, and determines whether the login user has been registered as the online user or not (step S103). That is, the shopping server 15 refers to the "online user data" in the DB 251 to discriminate whether it includes the received information. More precisely, the shopping server searches for the received account information among the account information sets registered in the DB 251.

If the login user is not registered online user, the shopping server 15 performs the process at step S101 to present the top page to the client terminal 31 again.

Figure 13:
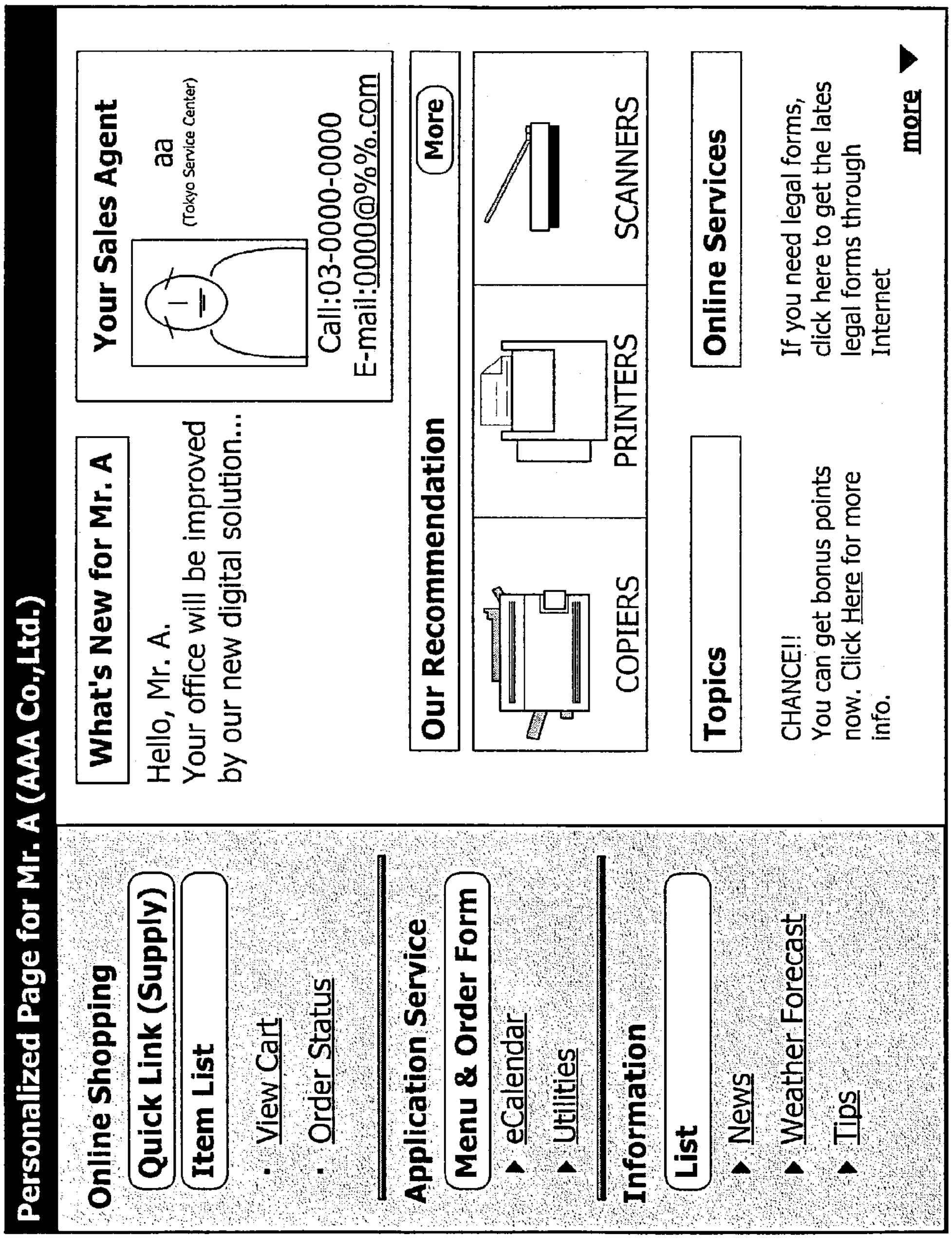
FIG. 13 exemplifying "Personalized Page" to be displayed on the client terminal.

On the contrary, if the login user is registered online user, the shopping server presents a personalized page to the client terminal 31 (step S104). More precisely, the shopping server 15 retrieves information of: sales agent, customer grade, owning items, recommended items, messages, and the like (see FIG. 7) of the login user from the DB 251. Then, the shopping server 15 refers to the DB 257 (related items) to specify items (for example, supply items) related to the items owned by the user concerned, and retrieves image data representing the specified items, sales agent, recommended items and the like from the DB 252 (material data). The shopping server 15 edits those materials to generate a personalized page as shown in FIG. 13, and transmits it to the client terminal 31 concerned. The presentation of the personalized page terminates the web page presentation process, and the process flow returns to the main flow shown in FIG. 5.

As shown in FIG. 13, the personalized page may be visually divided by frames. In FIG. 13, a leftward frame shows indexes those allowed to be selected by the user concerned. A rightward frame is a main page of the personalized page, and includes a message from the sales agent, information about the sales agent, information representing recommended items, and other information (topics, service information, and the like).

Figure 14:
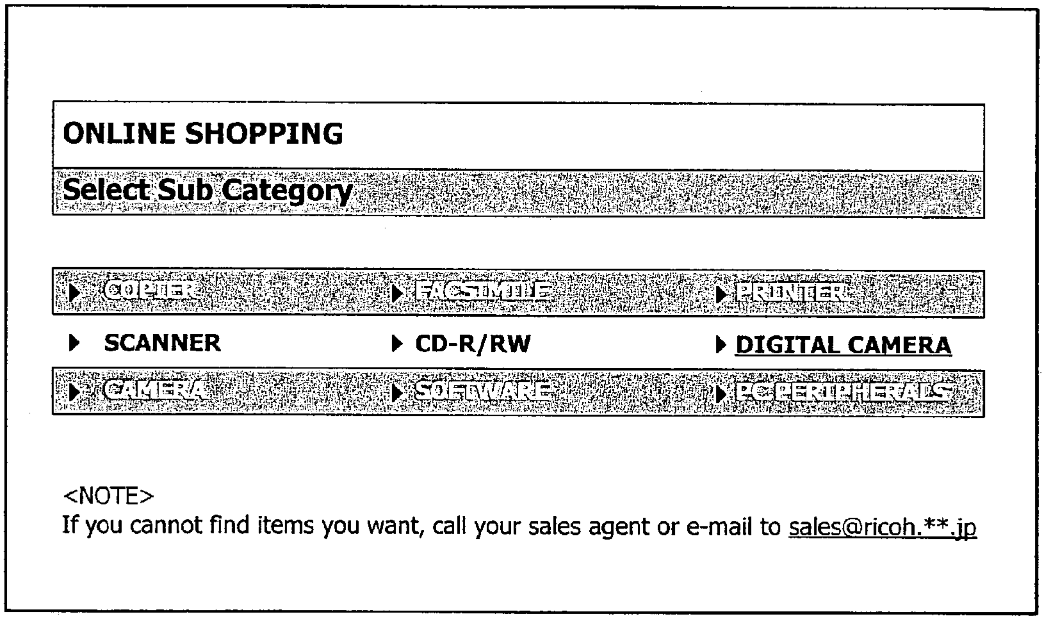
FIG. 14 exemplifying "Category Select Page" to be displayed on the client terminal.

The personalized page acts as a portal to enjoy the online shopping. For example, in response to selection of "Item List" on the left frame, the shopping server 15 generates an item list page as shown in FIG. 14 and present it to the client terminal 31. As shown in FIG. 14, the item list page may show categories of the available items.

Figure 15:
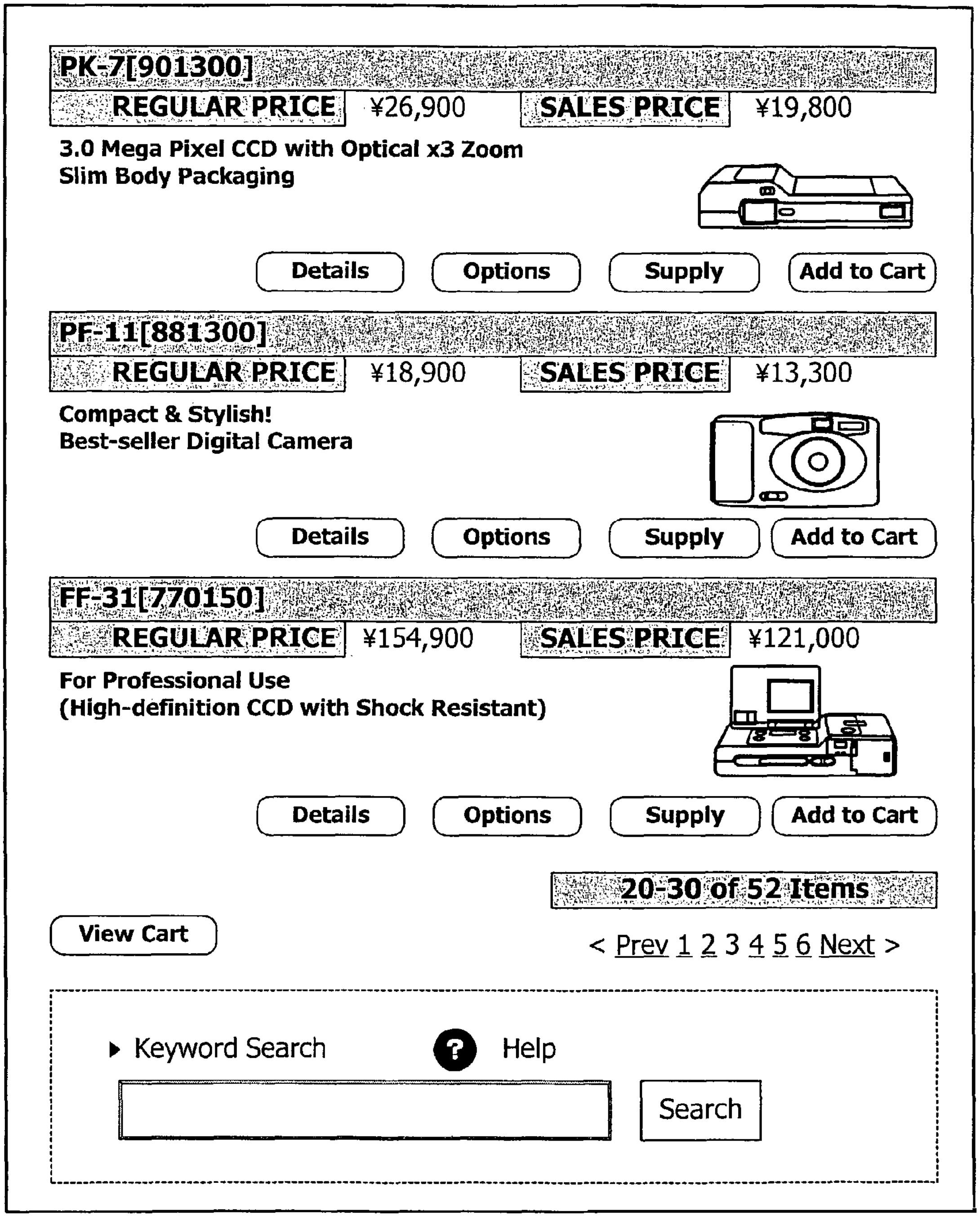
FIG. 15 exemplifying "Shopping Page" to be displayed on the client terminal.

In response to selection of desired category by the user, the shopping server 15 generates a shopping page including items of the selected category as shown in FIG. 15, and transmits it to the client terminal 31 concerned. The user may chose desired items through the shopping page. More precisely, if the user clicks "Add to Cart" button, for example, the shopping server 15 recognizes the item corresponding to the button as a selected item for the purchase.

Figure 16:
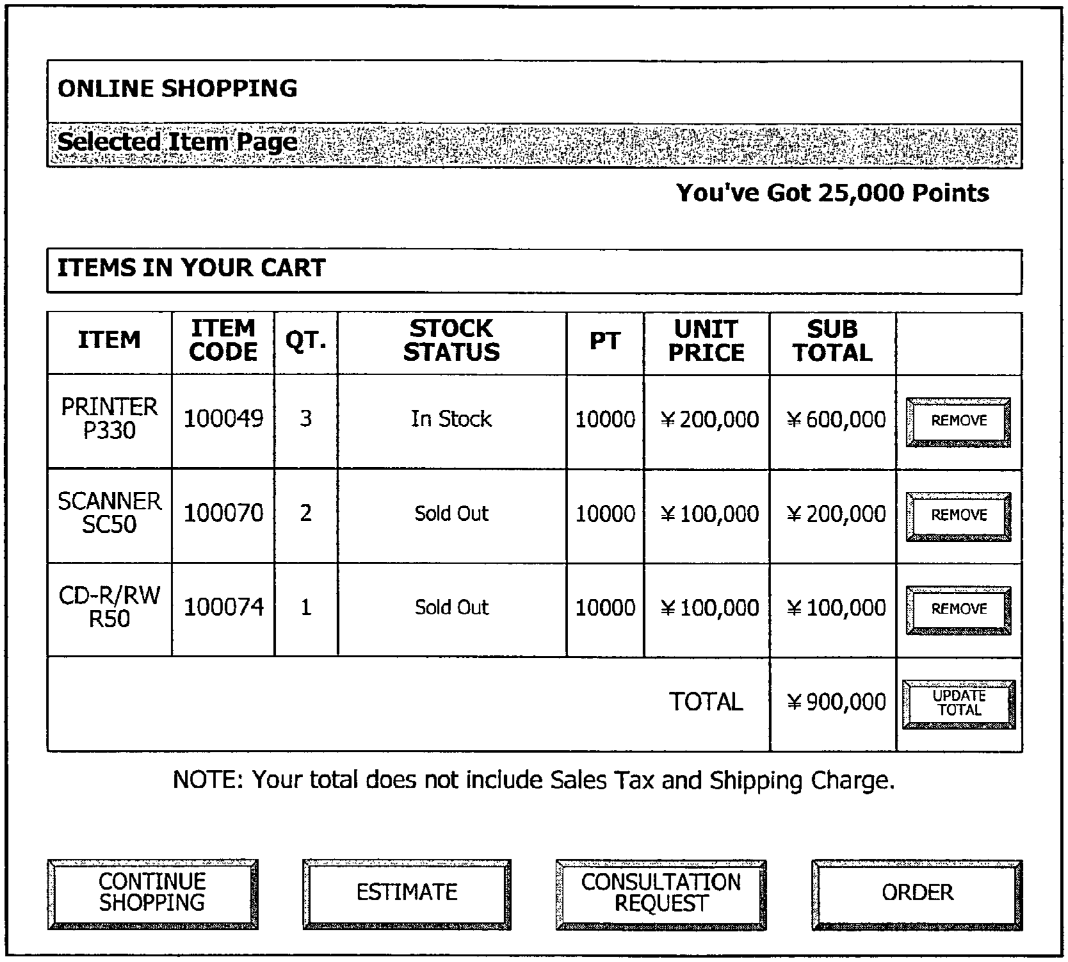
FIG. 16 exemplifying "View Cart Page" to be displayed on the client terminal.

If the user clicks "View Cart" button, for example, the shopping server generates a selected item page as shown in FIG. 16, and transmits it to the client terminal 31 concerned. The selected item page not only presents details of the selected items, but also accepts instructions for estimate and the like.

If the user clicks "Estimate" button, the shopping server 15 executes "Estimate Generation" process (step S2, FIG. 10). Through the estimate generation process, the shopping server 15 generates estimate with asking the shipping arrange server 17 stock status.

Figure 17:
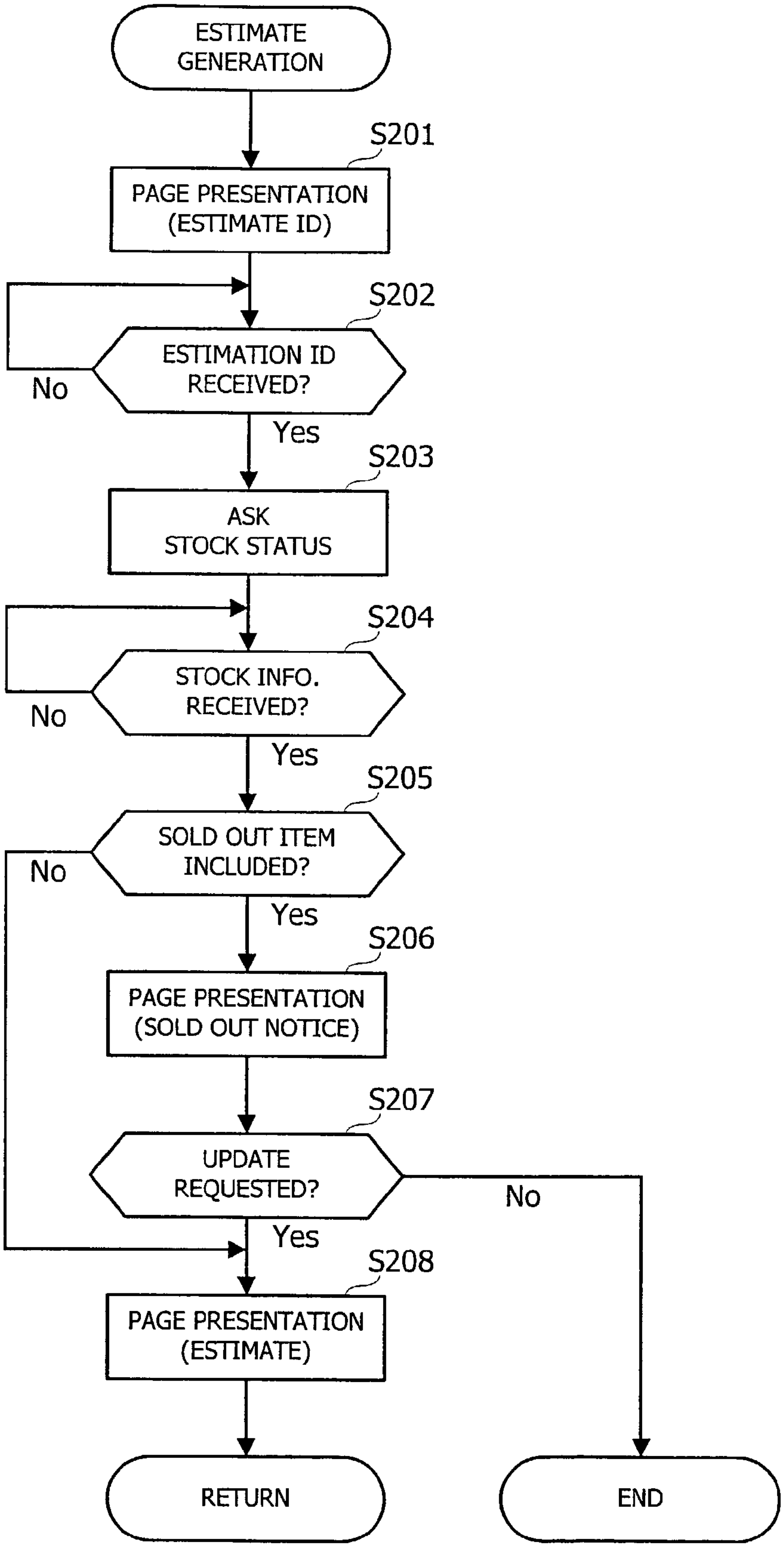
FIG. 17 representing a flowchart for explaining "Estimate Generation" process.
Figure 18:
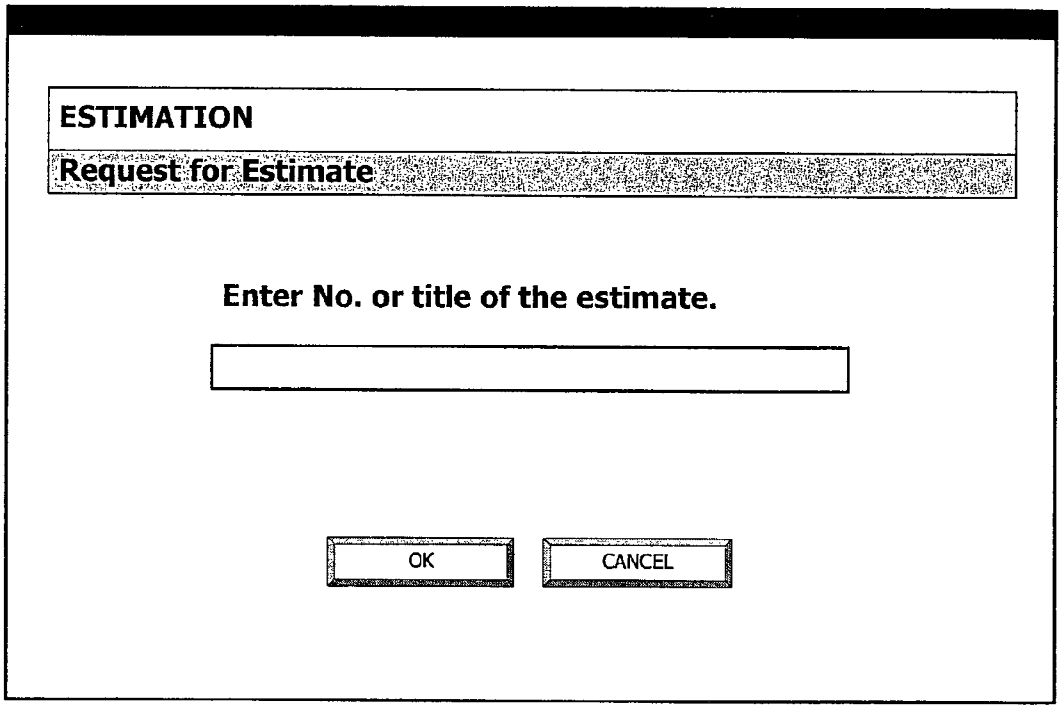
FIG. 18 exemplifying "Request for Estimate Page" to be displayed on the client terminal.

Detailed steps of the estimate generation process will now be described with reference to the flowchart shown in FIG. 17. The shopping server 15 presents an input form page which accept estimation ID as shown in FIG. 18 to the client terminal 31 concerned (step S201). Estimation ID may represents arbitrary number or title given by the user to the estimate.

The shopping server 15 waits for instructions (including estimation ID) from the client terminal 31 concerned (step S202).

In response to clicking "OK" button after entering the estimation ID through the input form page shown in FIG. 18, the client terminal 31 submit the information including the estimation ID to the shopping server 15.

In response to receiving the estimation ID, the shopping server 15 asks the stock status of the items included in the selected item page shown in FIG. 16 to the shipping arrange server 17 (step S203). And the shopping server 15 waits for the response (inventory report) from the shipping arrange server 17 (step S204).

According to the request from the shopping server 15, the shipping arrange server 17 refers to the DB 274 (inventory data), and generates inventory report representing stock status of the items concerned. The shipping arrange server 17 transmits the inventory report to the shopping server 15.

In response to reception of the inventory report, the shopping server 15 analyses the inventory report to find out sold-out item(s) (step S205). "Sold-out Item" includes, for example, dead-stock items, or rare items whose production does not catch up with the market's demand.

Figure 19:
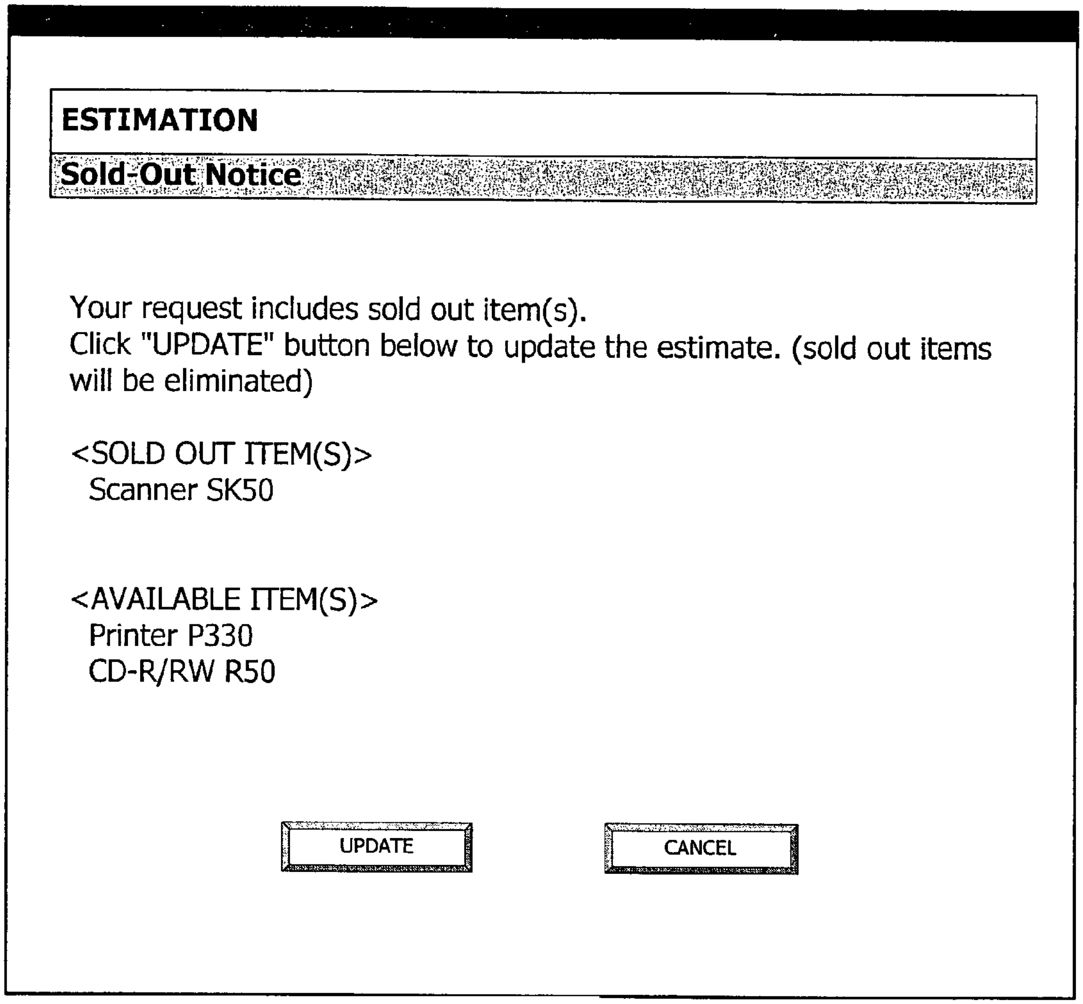
FIG. 19 exemplifying "Sold Out Notice Page" to be displayed on the client terminal.

If all items are available, the shopping server 15 proceeds the process flow to step S208 (described later). On the contrary, if there is a sold-out item, the shopping server 15 generates "Sold Out Notice" page as shown in FIG. 19, and presents it to the client terminal 31 concerned. The user has an option whether to re-generate estimate only for the available items (update estimate).

If the user clicks "Update Estimate" button on the sold out notice page, the client terminal 31 submit information for requesting update of the estimate to the shopping server 15.

The shopping server 15 determines whether the user requests update or not (step S207).

If the user does not request the update (that is, it has not received the request for update), the shopping server 15 terminates the estimate generation process. On the contrary, in response to reception of the update request (even if all items are available), the shopping server 15 re-generates the estimate as shown in FIG. 20 and present it to the client terminal 31 concerned (step S208).

The presentation of the updated estimate is the final step of the estimate generation process, therefore, the shopping server 15 returns the process flow to the main flow shown in FIG. 10.

The shopping server 15 then executes "Estimation Entry" process (step S3, FIG. 10). Through the estimation entry process, the generated estimate and the estimation ID given by the user are associated with each other, and are entered in the DB 256 (estimates and bills). According to this process, the DB 256 stores data representing estimation for the items selected by the user.

Figure 20:
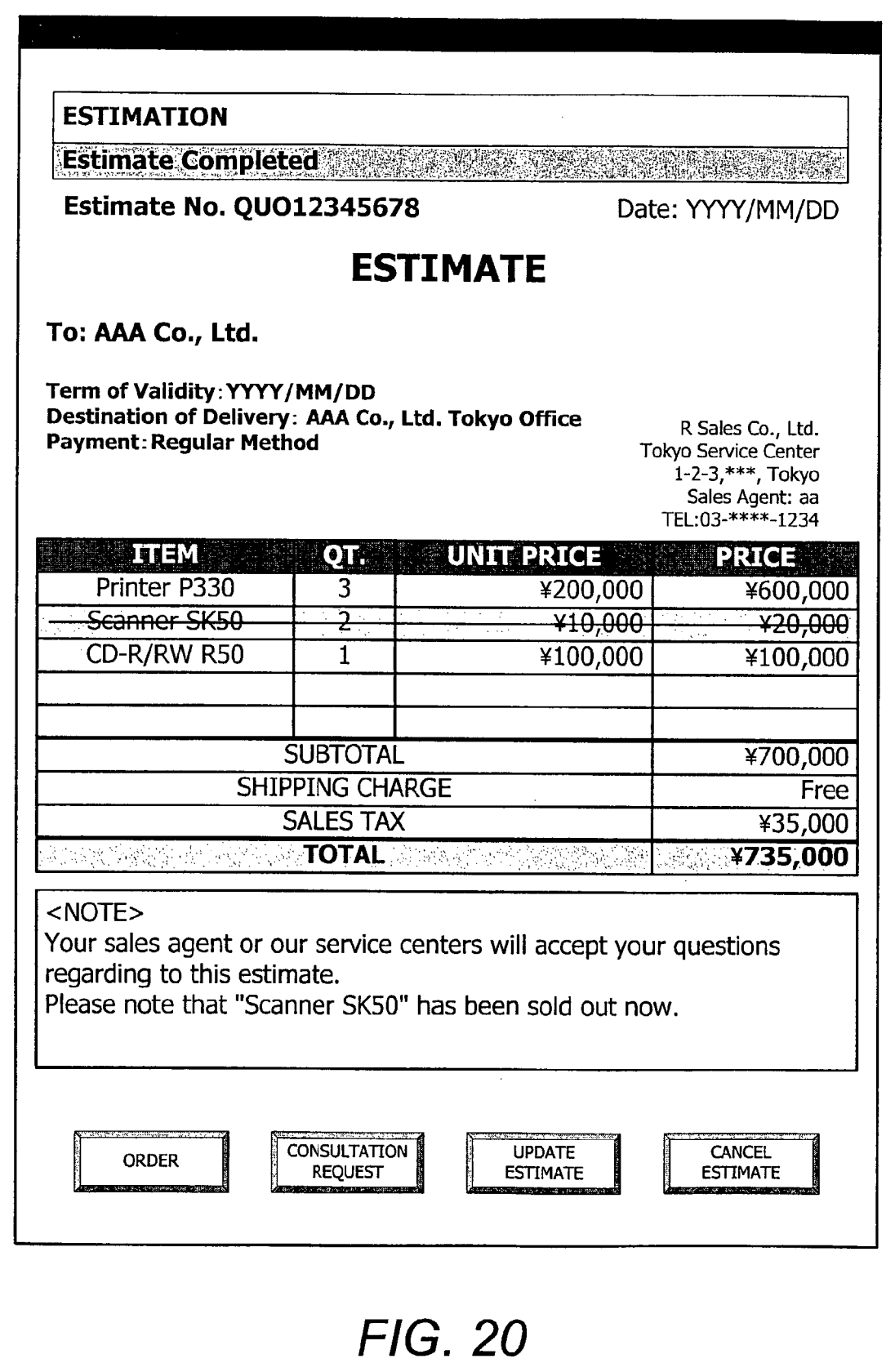

If the user clicks "Request Consultation" button on the estimation page shown in FIG. 20, the shopping server 15 executes the "Consultation Request" process (step S4, FIG. 10). Through the consultation request process, the user (purchase manager or the like) requests the consultant (superior officer of the purchase manager or the like) to have a consultation of the estimate for approval.

Figure 21A:
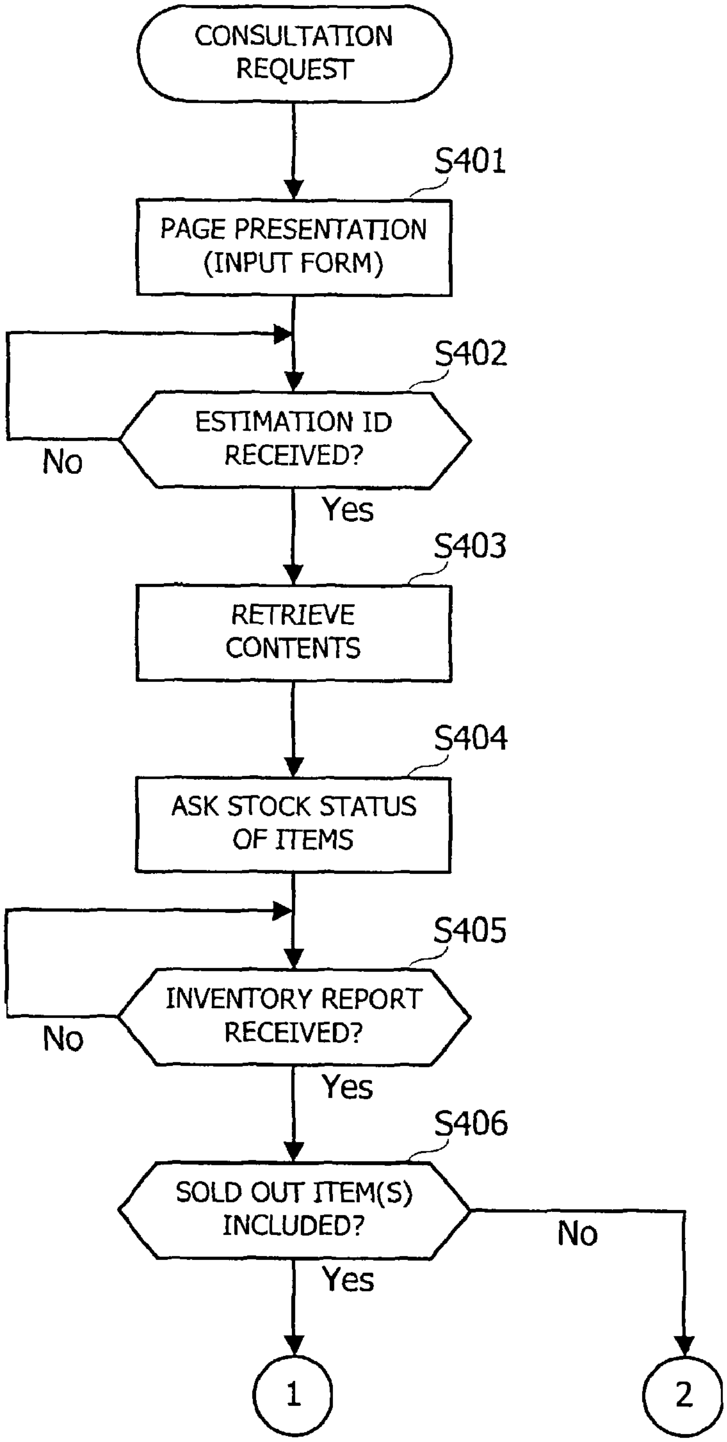
FIG. 21A representing a flowchart for explaining the early stages of the estimate generation process.

Detailed steps of the consultation request process will now be described with reference to a flowchart shown in FIGS. 21A-21C. As shown in FIG. 21A, the shopping server 15 presents an input form page for request the consultation as shown in FIG. 22. to the client terminal 31 concerned (step S401). The user (who ordered the estimation) inputs information of: name of the consultant; title of the request (request ID); reason for acquisition of the items; deadline for reply; and the like, through the form page shown in FIG. 22. The form page may have input support objects such as list box or combo box. For example, names of the superior officers of the user concerned may be listed as names of the consultant to be selected by the user.

The shopping server waits for request information given by the client terminal 31 concerned (step S402).

The user operates the client terminal 31 to input required information through the input form page shown in FIG. 22, and clicks "OK" button. According to this action, the client terminal 31 transmits the input information (request information) to the shopping server 15.

In response to reception of the request information, the shopping server 15 retrieves data of the estimation concerned from the DB 256 (step S403). In other words, the shopping server 15 retrieves estimation data registered at the estimation entry process (step S3, FIG. 10) from the DB 256. According to the retrieved estimation data, the shopping server asks the shipping arrange server 17 the stock status of the estimated items (step S404). Then, the shopping server 15 waits for inventory report given by the shipping arrange server 17 (step S405).

In response to reception of the inventory report, the shopping server 15 analyzes the inventory report to determine whether a sold-out item is included or not (step S406).

Figure 21B:
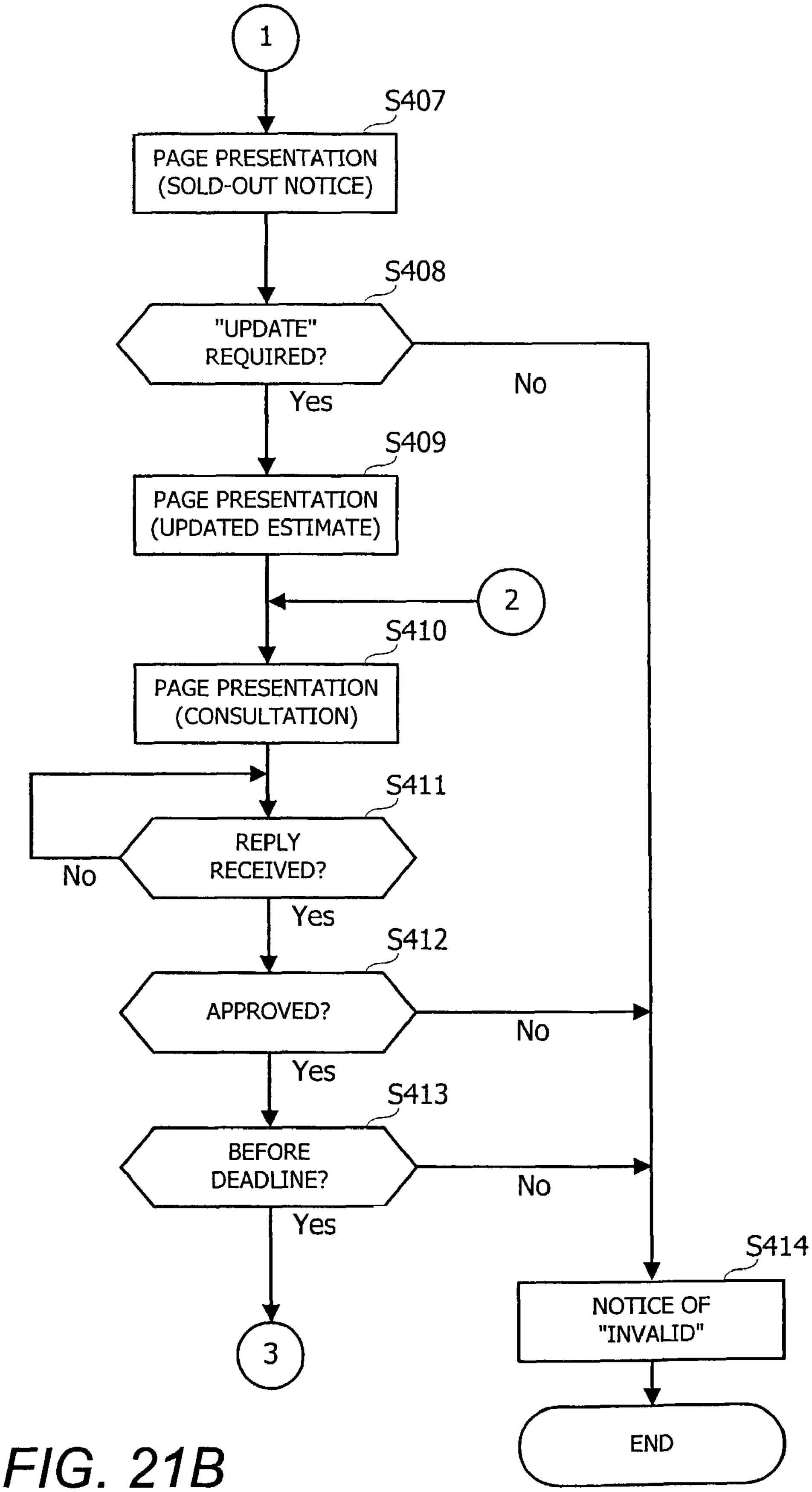
FIG. 21B representing a flowchart for explaining the middle stages of the estimate generation process.

If all items are available, the shopping server 15 proceeds the process flow to step S410 (FIG. 21B, described later). On the contrary, if it includes a sold-out item, the shopping server 15 presents the sold-out notice page as shown in FIG. 19 to the client terminal 31 concerned (step S407, FIG. 21B).

The shopping server 15 discriminates whether the client terminal 31 concerned provides the shopping server 15 of a request for update the estimate or not (step S408). If the request has not been given, the shopping server 15 proceeds the process flow to step S414 (described later).

On the contrary, if the client terminal 31 concerned transmits the request for estimation update, the shopping server 15 updates the estimate and presents the updated estimate as shown in FIG. 20 to the client terminal 31 concerned.

Figure 23:
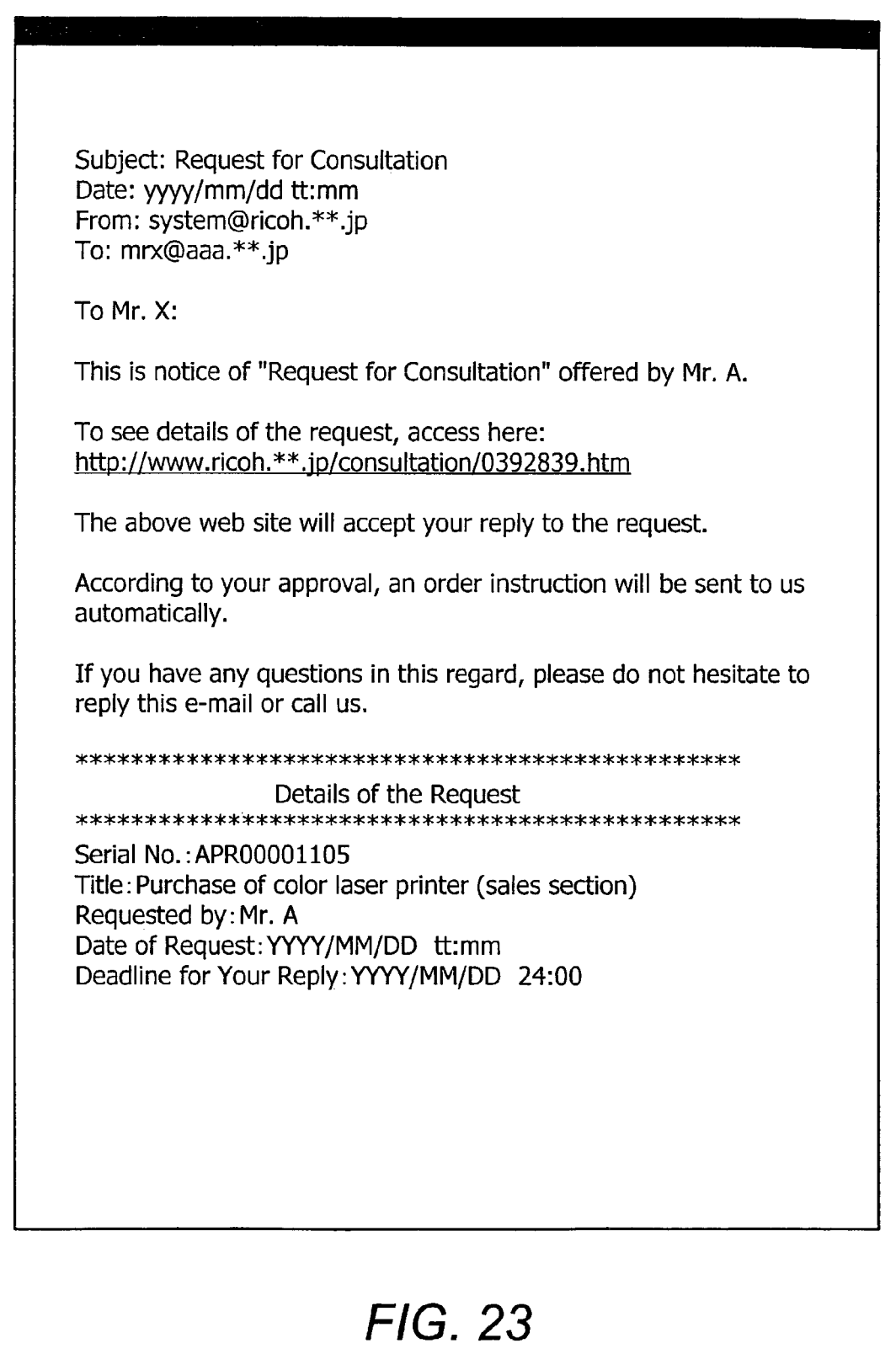

If the user clicks "Consultant Request" button on the updated estimate page (even if all items are available), the shopping server 15 generates an e-mail for requesting the consultation as shown in FIG. 23, and transmits it to the client terminal 31 of the consultant concerned (step S410). The e-mail includes hyperlink script which indicates address (URL) of a personalized page for the consultant concerned while being linked to there. The personalized page for the consultant will be prepared for replying to the request.

The shopping server 15 waits for reply from the client terminal 31 of the consultant concerned (step S411).

The client terminal 31 of the consultant concerned receives the e-mail and displays it. If the user clicks the underlined text showing the address of the consultant's personalized page, the client terminal 31 accesses the web page designated by the address and displays the consultant's personalized page shown in FIG. 24. As shown in FIG. 24, the personalized page (at middle in the right frame) includes an indication saying that the request for the consultant has been given, and "View Request" button for viewing the request.

If the consultant concerned clicks "View Request" button, the shopping server 15 generates "Reply to Request" page as shown in FIG. 25, and presents it to the client terminal 31 of the consultant. As shown in FIG. 25, the page indicates contents of the estimate and information given by the requestor through the form page for the request shown in FIG. 22. The page also includes buttons of "Approve (Order)", "Reject", "View Estimate", "View Items", and the like.

"Approve (Order)" button is to be selected when the consultant approves the estimate. Once this button is clicked, information representing "approval" will be given to the shopping server 15 as a reply.

"Reject" button is to be selected when the consultant rejects the estimate. Once this button is clicked, information representing "rejection" will be given to the shopping server 15 as a reply.

"View Estimate" button is to be selected when the consultant wants to see the estimate concerned. In response to depression of this button, the shopping server 15 provides the client terminal 31 concerned of the estimation page as shown in FIG. 20.

"View Item" button is to be selected when the consultant wants to see the items in the estimate concerned. In response to depression of this button, the shopping server 15 provides the client terminal 31 concerned of pages indicating details of the items.

In response to reception of the reply caused by clicking "Approve (Order)" button or "Reject" button, the shopping server 15 determines whether the reply indicates "approval" or not (step 412). If the reply indicates "reject", the shopping server 15 proceeds the process flow to step S414.

On the contrary, if the reply indicates "approval", the shopping server 15 further determines whether it is before the deadline or not (step S413).

If it has been expired (or, estimation update was not selected at step S408 or the request was rejected at step S412), the shopping server 15 generates a notice of "invalid". The shopping server 15 transmits the notice to the client terminal 31 of the requestor (step S414), and terminates the consultation request process. The notice may be an e-mail saying that the request has been invalid, directed to the client terminal 31 of the requester.

Figure 21C:
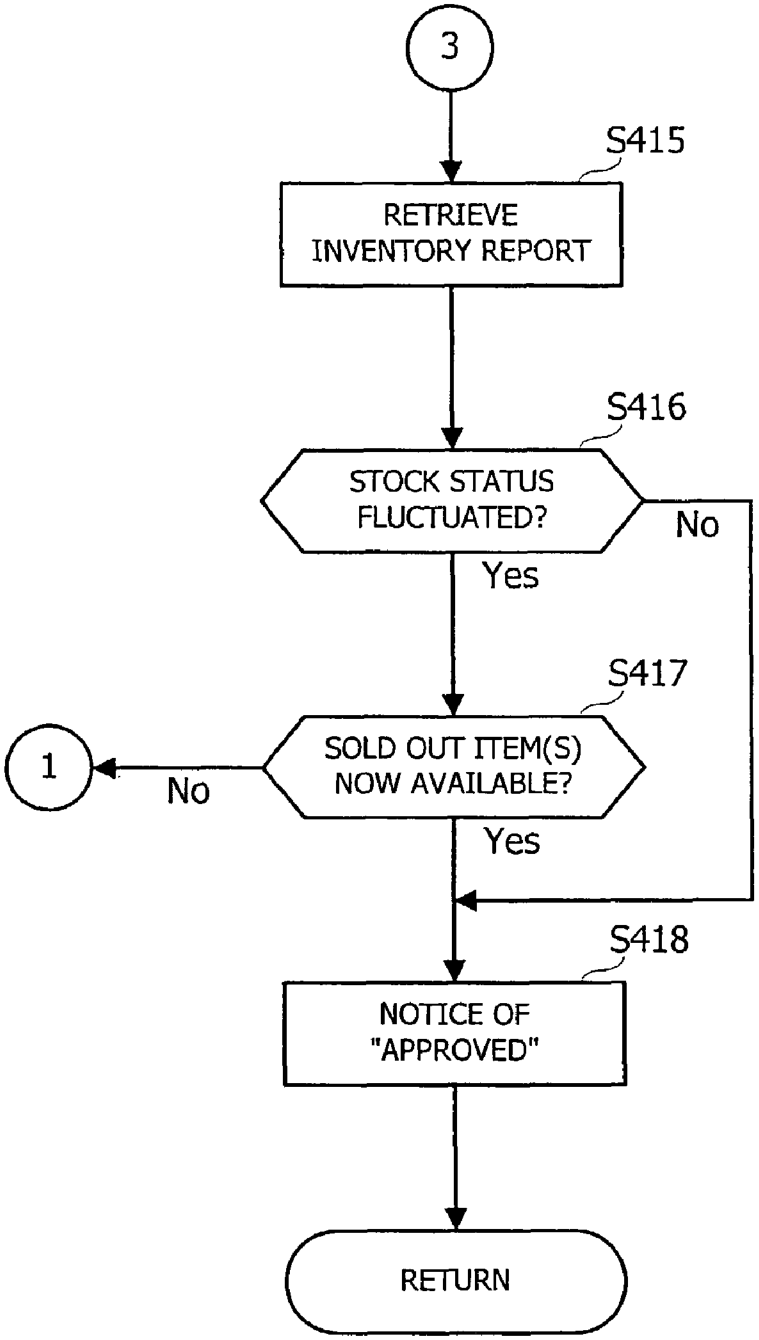
FIG. 21C representing a flowchart for explaining the last stages of the estimate generation process.

On the contrary, if it is before the deadline, the shopping server 15 asks the shipping arrange server 17 the stock status of the estimated items, and obtains an inventory report (step S415, FIG. 21C).

The shopping server 15 detects whether the stock status has been fluctuated or not (step S416). More precisely, the shopping server 15 compares the inventory report obtained at step S405 with the other one obtained at step S415.

If there is no fluctuation, the shopping server 15 proceeds the process flow to step S418 (described later). On the contrary, if the stock status has been fluctuated, the shopping server 15 determines whether the "sold-out" item has turned to "in-stock" item (step S417). In other words, the shopping server 15 determines whether the item which was "sold-out" at the request was raised is now "in-stock" or not.

If there is an item whose stock status has been fluctuated from "in-stock" to "sold-out", the shopping server 15 proceeds the process flow back to step S407 (FIG. 21B).

Figure 26:
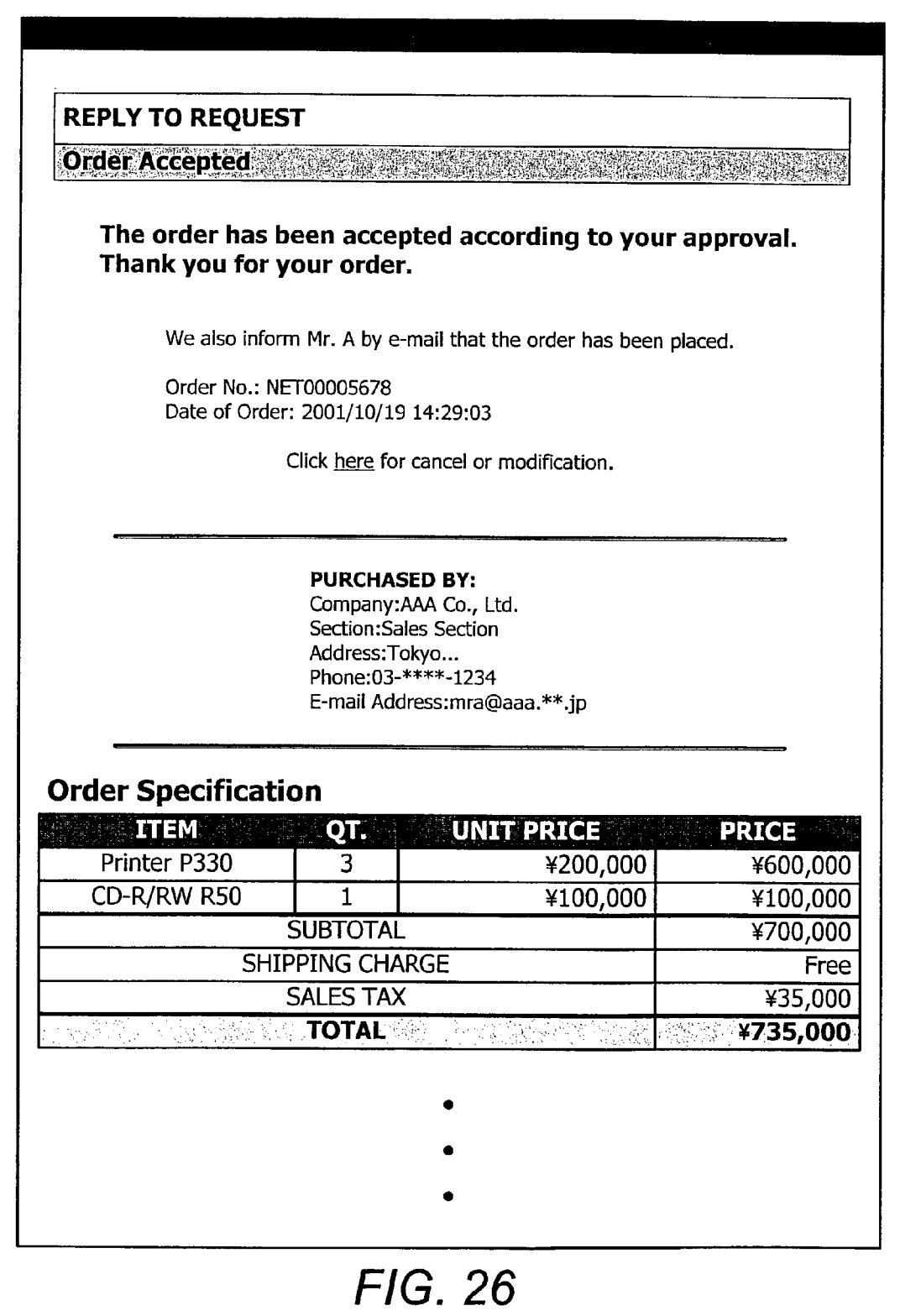

On the contrary, if there is an item whose stock status has been fluctuated from "sold-out" to "in-stock" (or, it was determined that the stock status has not been fluctuated at step S416), the shopping server 15 generates a notice "approval", and presents it to the client terminals 31 (step S418). For example, the shopping server 15 presents "Order Fulfilled" page indicating that the reply (approval) has been accepted thus the order is placed (FIG. 26) to the client terminal 31 of the consultant, while transmitting an e-mail indicating that the estimate concerned has been approved to the client terminal 31 of the user who requested the consultation. Then the "Consultation Request" process is completed, and the shopping server 15 continuously executes the following steps on the main flow shown in FIG. 10.

As described above, the shopping server 15 does not update the estimate even if it is determined at step S417 that the stock status has been fluctuated from "sold-out" to "in-stock", because the number of the items has increased when the estimate is approved. The increase of the items raises the amount billed. If the consultant approves the estimate which includes the increased items, that is, items not intended by the requester, it is unclear who has the responsibility for the purchase concerned. This makes no sense of the consultation request.

On the contrary, the shopping server 15 updates the estimate at step S407 if it is determined at step S417 that the stock status shows the fluctuation from "in-stock" to "sold-out". This action prevents the company from ordering unavailable items.

Thus the estimate has been approved through the consultation request process described above, the shopping server executes "Ordering" process in accordance with the main flow shown in FIG. 10 (step S5). Through the ordering process, the shopping server 15 notifies the shipping arrange server 17 of the items included in the approved estimate, so as to provide the shipping arrange server 17 of instructions for ordering and shipping.

The shipping arrange server 17 receives the notice as an order instruction, and instructs an appropriate delivery center to ship the items.

According to the above described embodiment, the shopping server 15 flexibly modifies the estimate offered by the business user (purchase manager) in accordance with the stock status of the items. This feature is helpful for effective use of the estimate information, because the consultant obtains up-to-date estimate when making decision.

Various embodiments and changes may be made thereunto without departing from the broad spirit and scope of the invention.

Though the above embodiment exemplifies the collaboration of the system for merchandising the goods at the shops with another for the online shopping, the target merchandises are not limited to the goods. For example, the online shopping system may collaborate with a system handling digital contents (images, music, and the like), service, or the like.

Though process between the client terminal 31 and the shopping server 15 are described mainly in the above embodiment, information handled by the system may be transferred to the sales agents via the in-shop terminal 11 and the like. For example, the shopping server 15 may transmit information of the estimate or order to the appropriate in-shop terminal 11 when the estimate is issued, the estimate is presented to the consultant, or the order is accepted, so as to notify the sales agent of it. More precisely, the shopping server 15 may previously register relational information of customers, items and sales agents to the shopping DB system 25, in order to specify the sales agent based on information of: the user who offered the estimate; the consultant; and the estimated items. The shopping server 15 specifies appropriate sales agent when generating the estimate, presenting the estimate and accepting the order, and transmits information of the estimate or the order to the in-shop terminal 11 handled by the specified sales agent. Accordingly, the online shopping system and the conventional business may be cooperated with each other, thus more effective customer support service will be realized.

Arbitrary modifications onto the configurations of the servers or databases may be allowed. Though the above embodiment exemplifies that each shop has a single in-shop terminal 11 as shown in FIGS. 1 and 2 for comprehensive description, a plurality of the in-shop terminals 11 may be installed in a shop. Those terminals may collaborate with each other via LAN. Each of the master server 13 and the shopping server 15 may include several server machines those collaborate with each other. The configurations of the databases also accepts arbitrary modifications. For example, integration of some databases works as a database for single purpose, or a single database may be functionally divided into some databases for different purposes. Though the servers or the databases share the same data in the above embodiment, such the data may be omitted or simplified. For example, instead of registering information representing relations between a completed item and option items or supply items to the DB 233 (item relations), such the relationship may be determined based on the item data stored in the DB 231 of the master DB system 23.

Or, the DB 233 (item relations) may be omitted. In this case, process regarding to the items relations may be handled with using the item data in the DB 257. In the same manner, the link information in the master DB system 23 may be omitted, while registering such the information only to the shopping DB system 25.

The system according to the present invention may be available by general purpose computer system. For example, programs and data necessary for realizing the above described steps on the computer may be stored in a arbitrary recording medium (FD, CD-ROM, DVD, or the like). Such the recording medium may be distributed as a computer program product to be installed to the general purpose computers. The computer may act as the above described system when the installed programs are executed under control of OS. Those programs and data concerned maybe stored in a server being connected to the internet. In this case, the programs and data are represented as a computer data signal to be embodied in a carrier wave. Distribution is also achieved by downloading the computer signal transferred through the telecommunications network by the carrier wave.

The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application 2001-401276 filed on Dec. 28, 2001 and including specification, claims, drawings and summary. The disclosure of the above Japanese Patent Application is incorporated herein by reference in its entirety.

What is claimed is:

1. An online merchandising system for merchandising items in response to request from user terminals connected via a telecommunications network, comprising:

a server configured with:

an estimation request acceptor for accepting a request for generating an estimate for arbitrary items designated by the user terminal;

an estimation generator for generating information of an estimate of the designated items based on the request accepted by said estimation request acceptor;

an estimation storage for storing the estimate information generated by said estimation generator;

a reference request acceptor for accepting a request for making reference to the prepared estimate information, the request being given from an other user terminal;

an inventory status retriever for retrieving information of inventory status of the items indicated by the estimate information stored in said estimation storage, the retrieving being performed when the reference request acceptor receives the request for making reference;

an estimation updater for updating the estimate information in said estimation storage based on the inventory status information retrieved by said inventory status retriever; and an estimation presenter for presenting the estimate information updated by said estimation updater to the other user terminal from which the request for making reference is received.

2. The online merchandising system according to claim 1, wherein said reference request acceptor receives the request for making reference, from said other user terminal, a consultation with which is requested by said user terminal; and said estimation presenter provides the user terminal with the updated estimate information by sending the updated estimate information.

3. The online merchandising system according to claim 1 further comprising:

a reply acceptor for accepting reply information indicating whether the estimate is approved or rejected from the user terminal to which the estimate information was presented by said estimation presenter; and an order acceptor for accepting an order for the items included in the estimate presented by said estimation presenter when said reply acceptor accepts the reply information indicating that the estimate has been approved.

4. The online merchandising system according to claim 1 further comprising a notice provider for providing the user terminal which requested the estimate of notice information indicating that the estimate has been approved, when said reply acceptor accepts the reply information indicating that the estimate has been approved.

5. A server being connected to user terminals via a telecommunications network, comprising:

a processor configured with:

an estimation request accepting unit which transmits an item menu data to said user terminal, and accepts a request for estimating selected items given by said user terminal concerned;

an estimation generating unit which generates estimation data representing estimate of the selected items based on the estimation request accepted by said estimation request acceptor;

an estimation storage unit which stores the estimation data generated by said estimation generating unit;

a presentation request accepting unit which: sends a consultant specifying page to prompt specifying a consultant who is responsible for authorizing the estimation to said user terminal; and accepts a request for presenting the estimation data to the specified consultant;

a prompting information sending unit which sends information prompting making reference to the generated estimation data to said other user terminal operated by the consultant;

a reference request accepting unit which accepts a request for making reference to the generated estimate information, the request being given from said other user terminal, to which said prompting information sending unit has sent the prompting information;

an inventory data retriever which retrieves information representing inventory status of the items indicated by the estimation data stored in said estimation storage unit;

an estimation updating unit which, when said reference request accepting unit accepts the request for making reference, updates the estimation data stored in said estimation storage unit in accordance with the inventory status information retrieved by said inventory data retriever;

an estimation presenting unit which presents the estimation data updated by said estimation updating unit to said other user terminal having requested making reference to the estimation data.

6. The server according to claim 5, wherein said prompting information sending unit acquires address information indicating the estimation data stored in said estimation storage unit and sends the information prompting making reference, containing said address information, to said other user terminal;

said reference request accepting unit accepts a request for making reference to the estimate information, from said other user terminal accessing the estimate information in accordance with the address information contained in the prompting information prompting making reference; and said estimation presenting unit presents the estimation data updated by said estimation updating unit by sending the updated estimate information to said other user terminal.

7. The server according to claim 5 further comprising:

a reply accepting unit which accepts reply information indicating whether the estimate is approved or rejected, from the user terminal to which the estimation data was presented by said estimation presenting unit; and an order accepting unit which accepts order for the items indicated by the estimation data presented by said estimation presenting unit, when said reply accepting unit accepts the reply information indicating that the estimate was approved.

8. The server according to claim 5 further comprising a notice transmitting unit which transmits information notifying that the estimate was approved to said user terminal which requested the estimate, when said reply accepting unit accepts the reply information indicating that the estimate was approved.

9. An estimation managing method applicable to a system for online merchandising in response to user terminals being connected to a telecommunications network, comprising the steps of:

accepting a request for estimation of designated items given by said user terminal;

generating estimation data representing estimation of the designated items in accordance with the accepted request for estimation;

storing the generated estimation data at a predetermined storage;

accepting a request for making reference to the prepared estimate information, the request being given from an other user terminal;

retrieving information representing inventory status of the items indicated by the stored estimation data, the retrieving performed when the accepting step accepts the request for making reference;

updating the stored estimation data in accordance with the retrieved inventory status information; and presenting the updated estimation data updated in said updating step to said other user terminal having requested making reference.

10. The method according to claim 9, wherein said accepting step accepts a request for making reference, from said other user terminal, a consultation with which is requested by said user terminal; and said presenting step presents said estimate information to the consultant by sending the updated estimation data updated in said updating step to said other user terminal.

11. The method according to claim 9 further comprising the steps of accepting reply information indicating whether the estimate was approved or rejected, given by said user terminal to which the estimation data was presented; and accepting an order for the items indicated by the presented estimation data in a case where the accepted reply information represents that the estimate was approved.

12. The method according to claim 9 further comprising the step of transmitting notice information indicating that the estimate was approved to said user terminal which requested the estimate in a case where the accepted reply information represents that the estimate was approved.

13. A computer program product including a non-transitory computer readable medium for causing a computer to execute an estimation managing method comprising the steps of:

accepting a request for estimation of designated items given by said user terminal; generating estimation data representing estimation of the designated items in accordance with the accepted request for estimation; storing the generated estimation data at a predetermined storage; accepting from a request for making reference to the prepared estimate information, the request being given from an other user terminal; retrieving information representing inventory status of the items indicated by the stored estimation data; updating the stored estimation data in accordance with the retrieved inventory status information, the retrieving performed when the accepting step accepts the request for making reference; and presenting the updated estimation data to said other user terminal in accordance with a request given by said user terminal which requested making reference to the estimation information.

* * * * *